(12) United States Patent
Cryderman et al.

(10) Patent No.: US 8,494,579 B2
(45) Date of Patent: *Jul. 23, 2013

(54) SYSTEM AND METHOD FOR ENABLING MESSAGES TO BE SENT WHILE A MOBILE DEVICE IS OUT-OF-COVERAGE

(75) Inventors: Aaron J. Cryderman, Waterloo (CA); Sherif Abdel-Kader, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/607,427

(22) Filed: Sep. 7, 2012

(65) Prior Publication Data

US 2012/0329495 A1 Dec. 27, 2012

Related U.S. Application Data

(63) Continuation of application No. 12/533,125, filed on Jul. 31, 2009, now Pat. No. 8,320,954.

(51) Int. Cl.
*H04M 1/00* (2006.01)

(52) U.S. Cl.
USPC .......... 455/552.1; 455/456.1; 455/456.5; 455/414.1; 455/412.1; 455/412.2

(58) Field of Classification Search
USPC .......... 455/552.1, 456.1, 456.5, 414.1, 412.2, 455/444; 709/206, 207, 238
See application file for complete search history.

(56) References Cited

U.S. PATENT DOCUMENTS

| | | |
|---|---|---|
| 6,580,981 B1 | 6/2003 | Masood et al. |
| 2004/0242209 A1 | 12/2004 | Kruis et al. |
| 2005/0108427 A1* | 5/2005 | Datta .......................... 709/238 |
| 2007/0106739 A1 | 5/2007 | Clark et al. |

FOREIGN PATENT DOCUMENTS

| | | |
|---|---|---|
| EP | 1802044 A1 | 6/2007 |
| EP | 1895784 A1 | 3/2008 |
| WO | WO 02/37771 A2 | 5/2002 |
| WO | WO 2006/043963 A1 | 4/2006 |

OTHER PUBLICATIONS

Tao (EP 1895784) Published Mar. 5, 2008.*
Mesh Networks; http://www.ofcom.org.uk/research/technology/research/emer_tech/mesh/; retrieved from the internet Jul. 31, 2009; published at least as early as Feb. 12, 2009.
Wireless mesh network; http://en.wikipedia.org/wiki/Wireless_mesh_network; Jul. 31, 2009.
Lombardi, G.; Search Report from corresponding European Application No. 09166935.8; search completed Dec. 22, 2009.

* cited by examiner

*Primary Examiner* — Manpreet Matharu
(74) *Attorney, Agent, or Firm* — Brett J. Slaney; Blake, Cassels & Graydon LLP

(57) ABSTRACT

A system and method are provided that enable a mobile device when out-of-coverage and thus unable to send or receive messages to rely on other mobile devices which are also out-of-coverage as "hosts" for their outgoing messages such that when one of the hosts comes back into coverage the host mobile device (HMD) can send the outgoing messages on behalf of the originating or "source" mobile device (SMD). The system and method may comprise a pairing procedure to determine the suitability of a mobile device being an HMD according to criteria such as battery power, memory availability and whether the device is also out of coverage. When coming back into coverage, information is obtained from the data communication system to determine whether others have already sent messages that have been provided to host mobile devices.

15 Claims, 28 Drawing Sheets

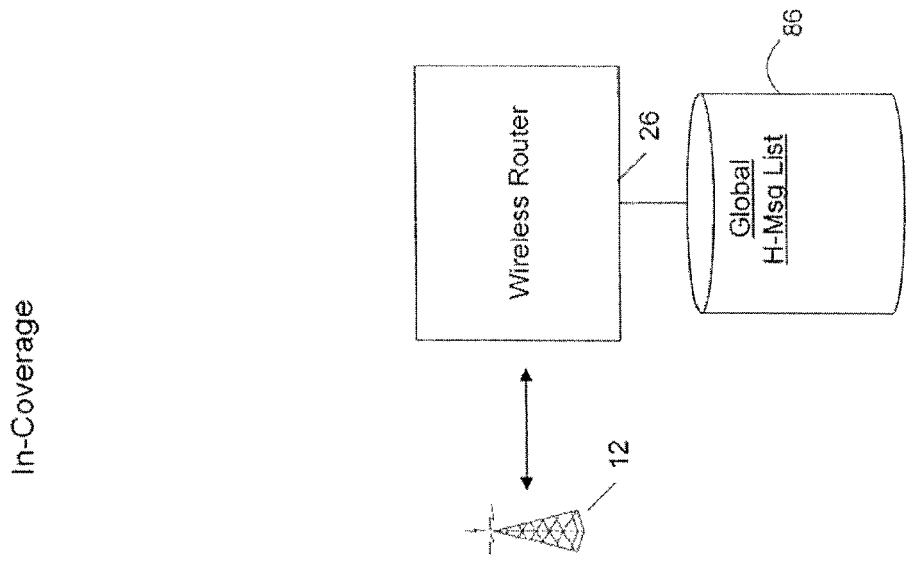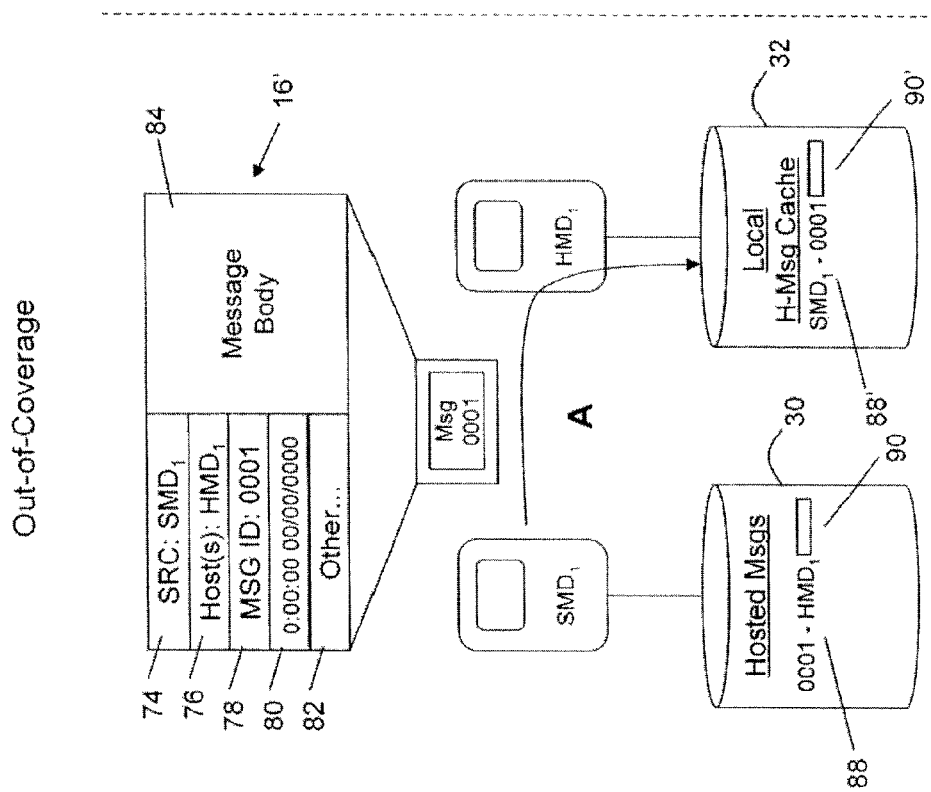
Figure 9(a)

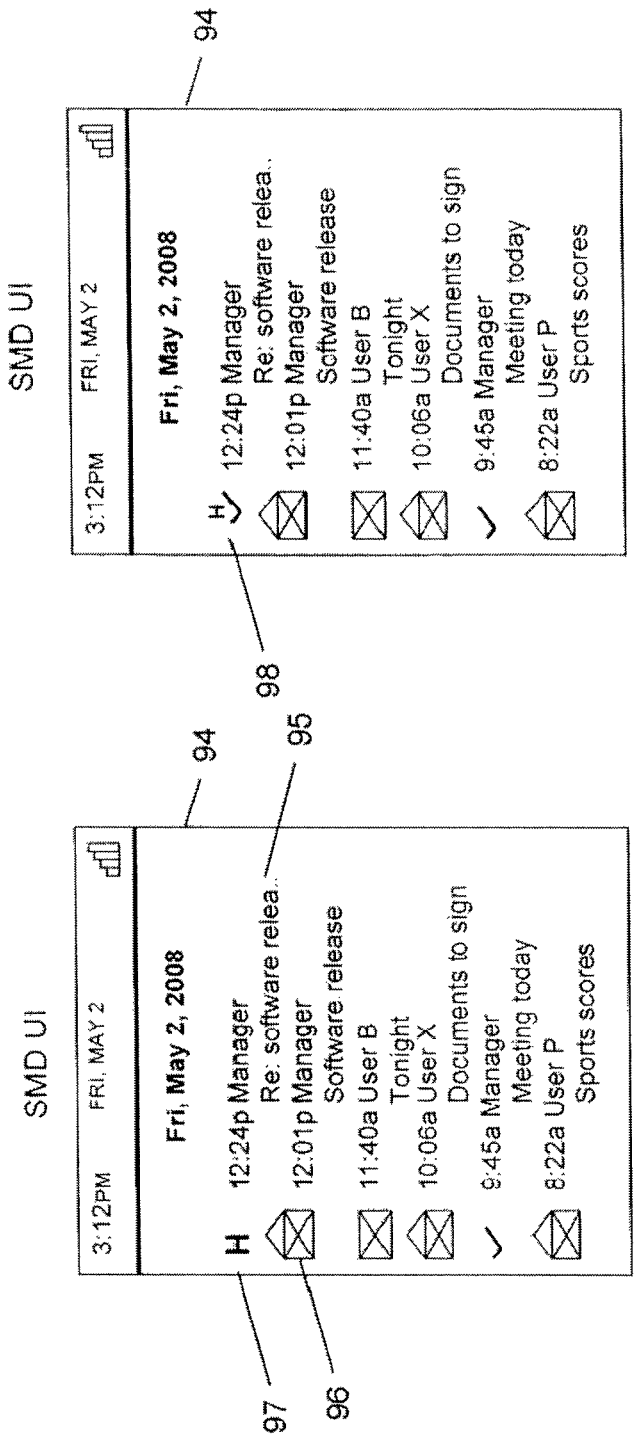

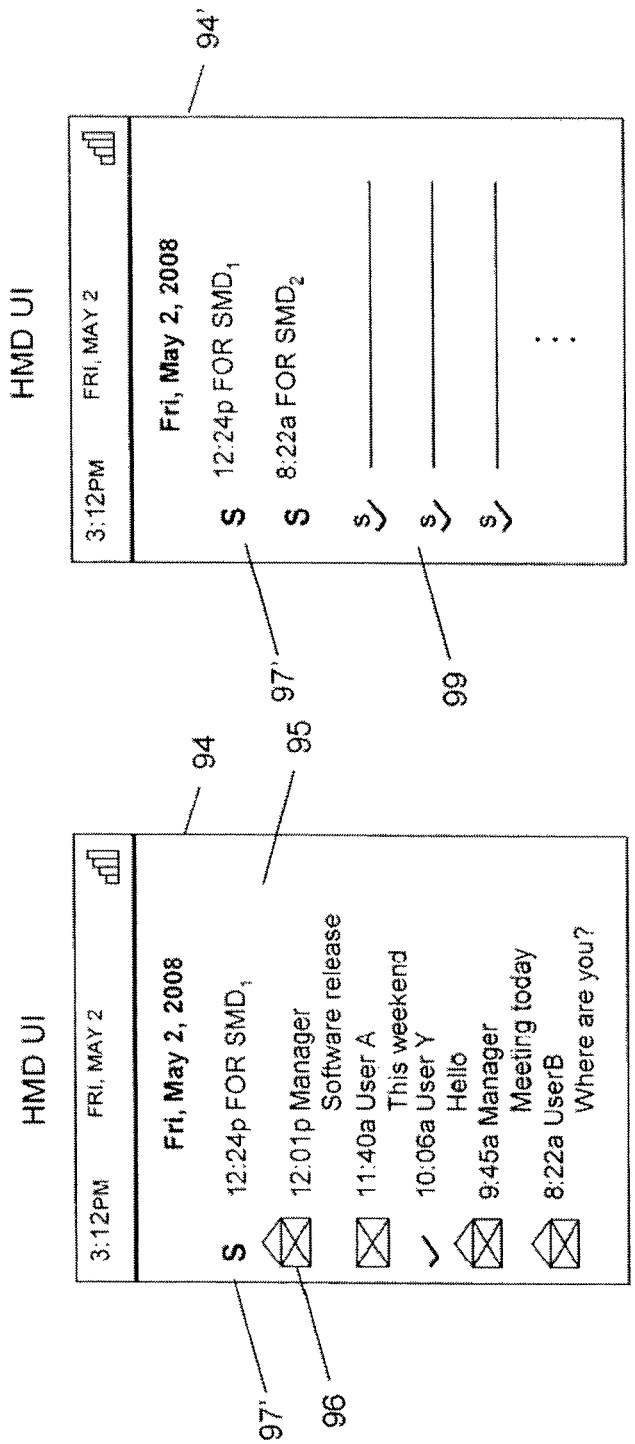

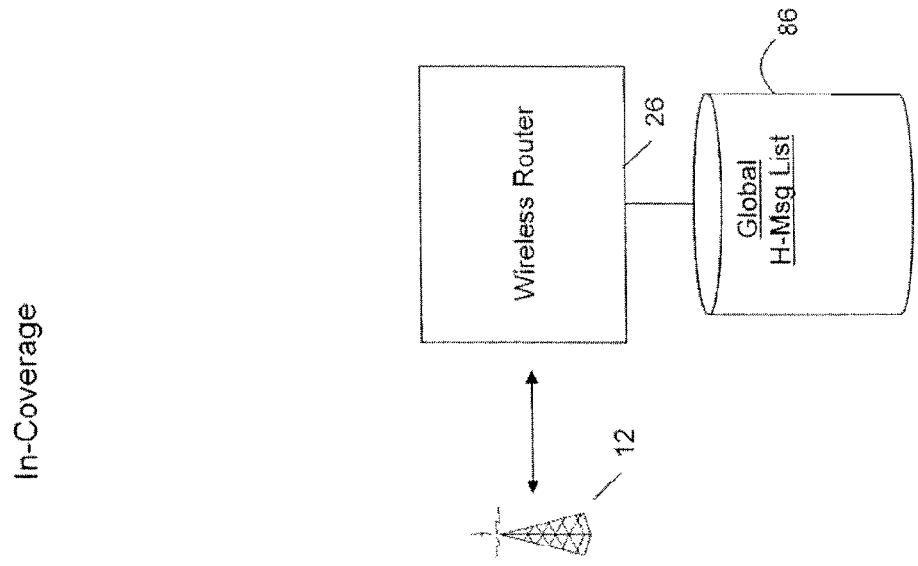
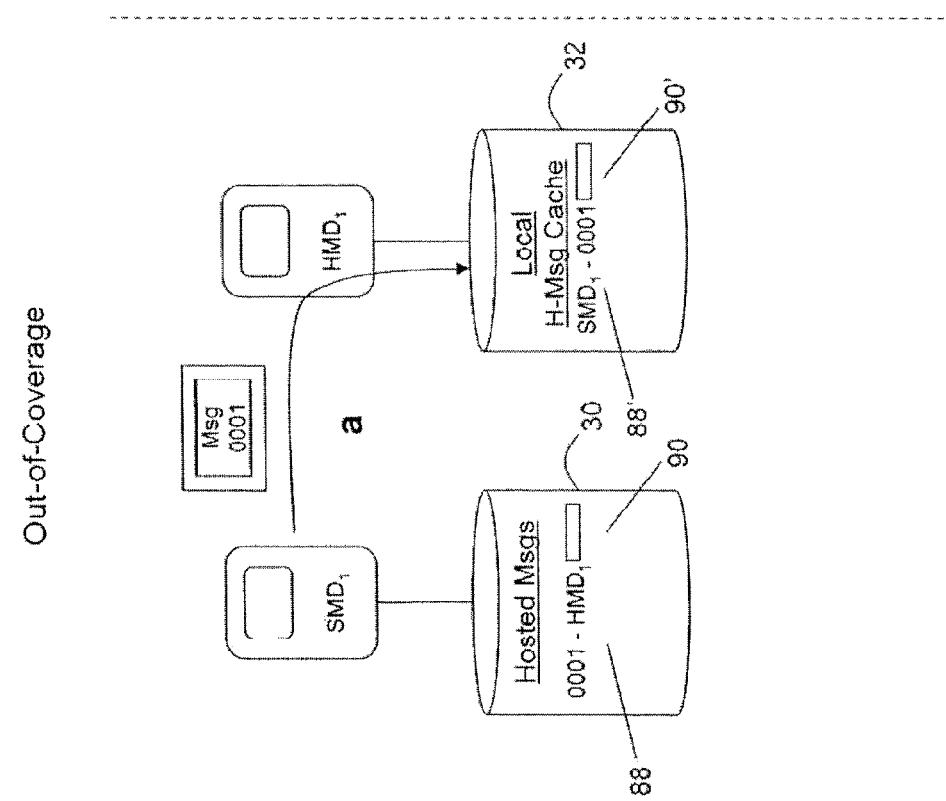
Figure 13(a)

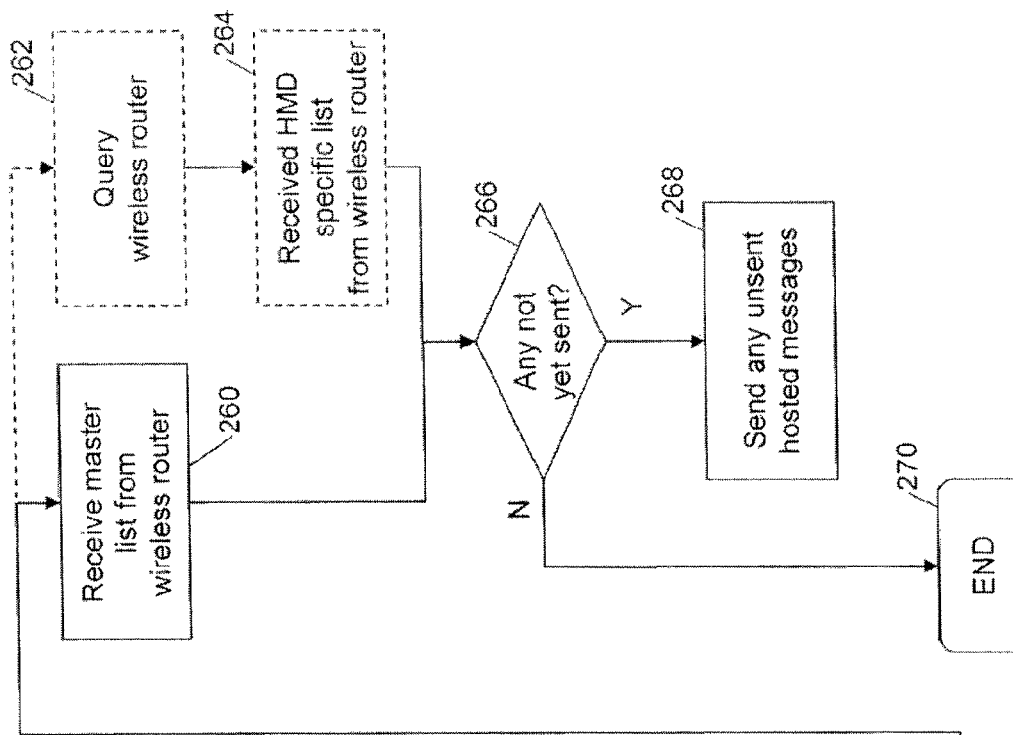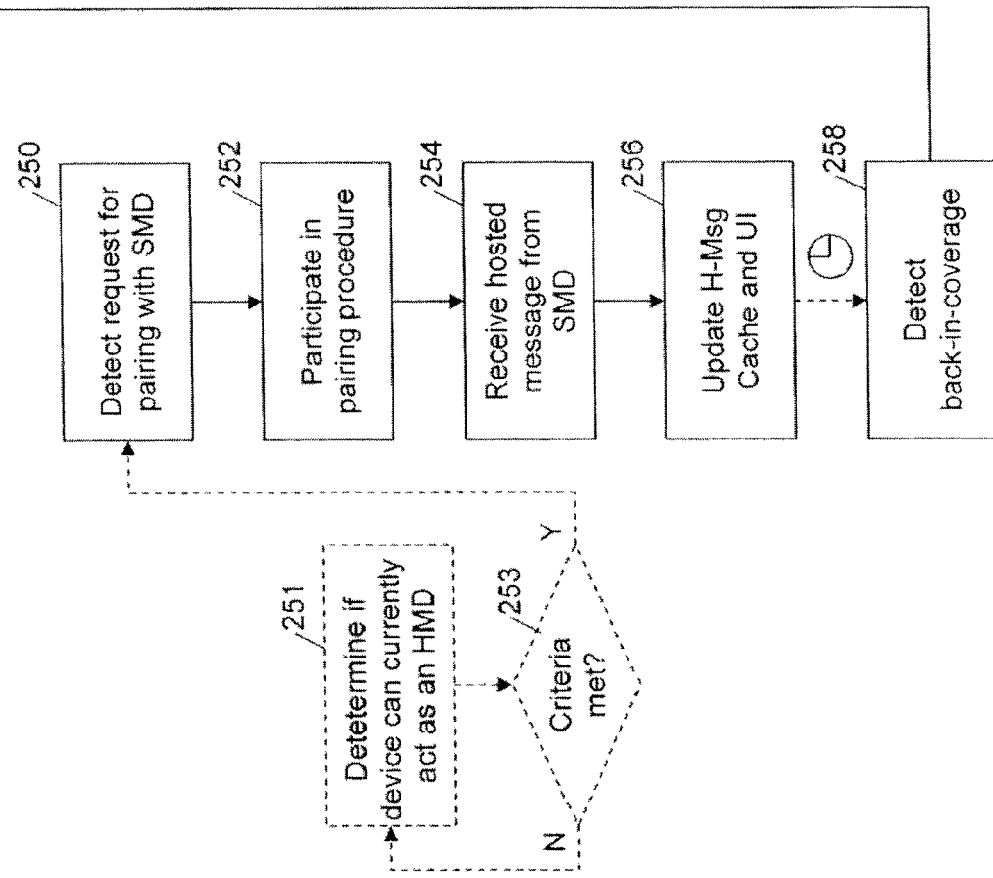
Figure 15

SYSTEM AND METHOD FOR ENABLING MESSAGES TO BE SENT WHILE A MOBILE DEVICE IS OUT-OF-COVERAGE

CROSS-REFERENCE TO RELATED APPLICATIONS

The present application is a continuation of U.S. patent application Ser. No. 12/533,125 filed on Jul. 31, 2009 incorporated herein by reference.

TECHNICAL FIELD

The following relates to systems and methods for enabling messages to be sent while a mobile device is out-of-coverage.

BACKGROUND

Mobile device coverage areas are typically limited to regions within a range of a wireless base station or Wi-Fi hotspot. When a mobile device is not within such coverage areas, the device is unable to send or receive messages and needs to wait until it is back-in-coverage in order to do so.

BRIEF DESCRIPTION OF THE DRAWINGS

Embodiments will now be described by way of example only with reference to the appended drawings wherein:

FIGS. 9(a) through 9(d) are flow diagrams illustrating an exemplary scenario wherein an HMD sends a message on behalf of an SMD when the HMD enters coverage first.

FIGS. 10(a) and 10(b) are exemplary graphical user interfaces (GUIs) at an SMD, showing an update to a message application showing a change in status for a message sent from an SMD to an HMD and then from the HMD to a destination.

FIGS. 10(c) and 10(d) are exemplary graphical user interfaces (GUIs) at an HMD, showing exemplary message applications showing the carriage of messages on behalf on an SMD.

FIGS. 13(a) through 13(g) are flow diagrams illustrating an exemplary scenario wherein an SMD sends messages to multiple HMDs and such HMDs enter coverage at different times.

FIG. 15 is a flow diagram illustrating exemplary computer executable operations for using the host message module to send a message on behalf of an SMD.

DETAILED DESCRIPTION OF THE DRAWINGS

Figure 1:
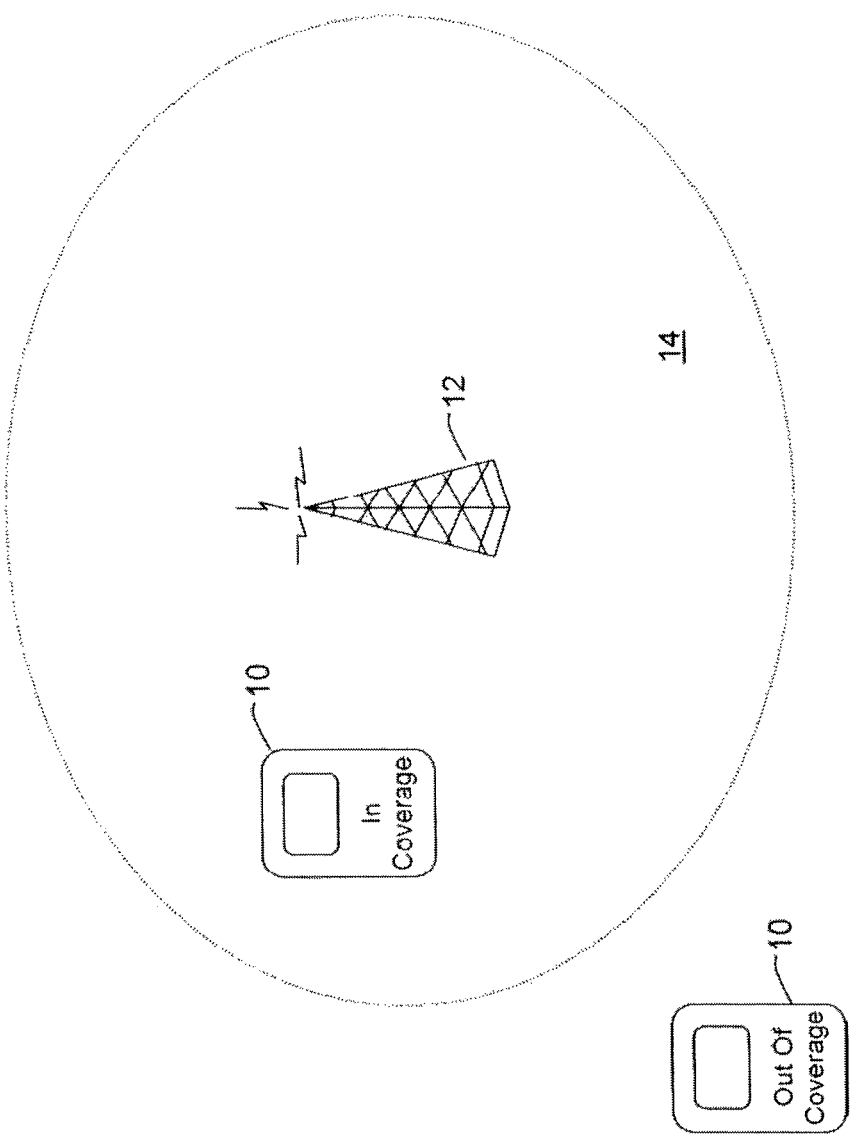
FIG. 1 is a schematic diagram showing a zone of coverage for a wireless base station, a mobile device that is in coverage, and a mobile device that is out of coverage.

Turning first to FIG. 1, a mobile device may hereinafter be referred to by numeral 10. While the mobile device 10 is within the coverage area 14 of an access point or wireless base station 12, it is able to receive data communications sent or transmitted from another entity. The mobile device 10 in the example shown in FIG. 1 is "out-of-coverage" when outside the coverage area 14, and is "in-coverage" when within the coverage area 14.

Figure 2B:
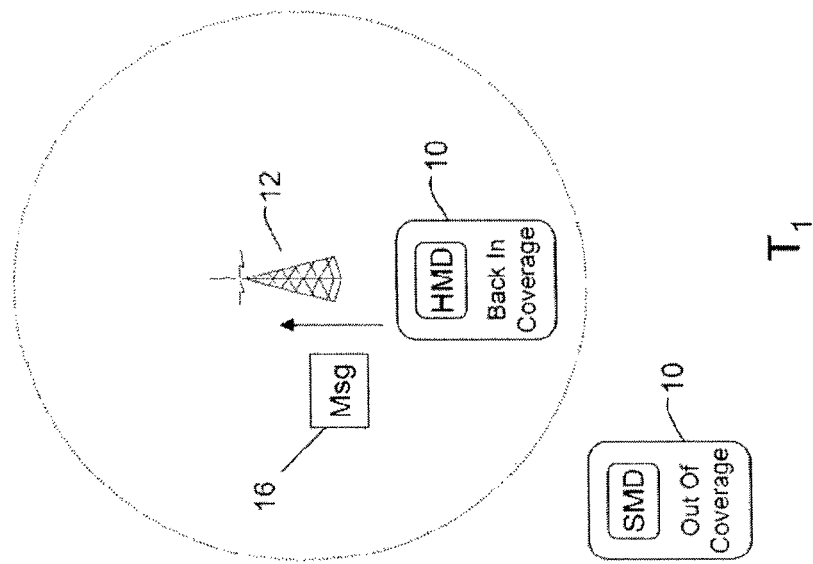
FIG. 2(b) is a schematic diagram showing the HMD in FIG. 2(a) entering coverage and sending the message on behalf of the SMD.
Figure 2A:
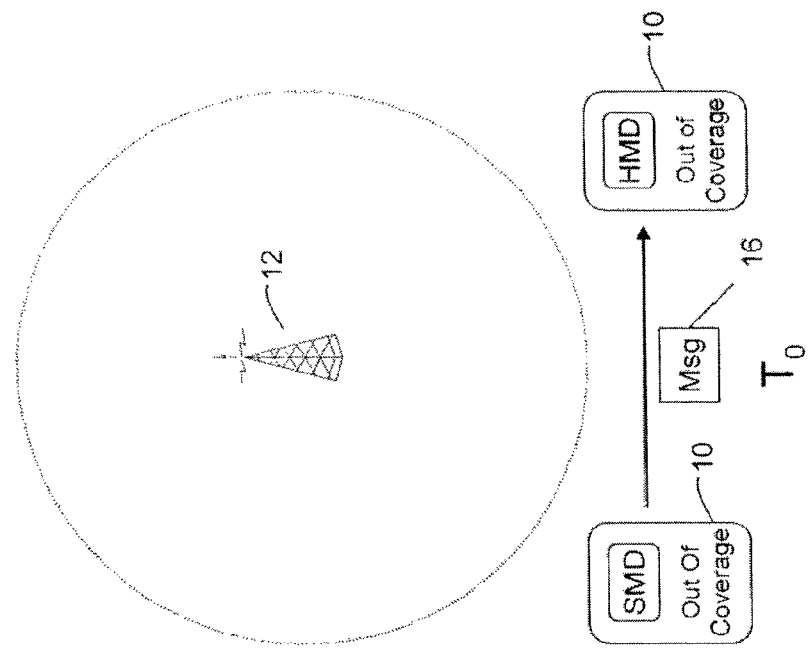
FIG. 2(a) is a schematic diagram showing a source mobile device (SMD) sending a message to a host mobile device (HMD) while both devices are out of coverage.

As shown in FIGS. 2(a) and 2(b), it has been found that when a mobile device 10 is out-of-coverage and thus unable to send or receive messages 16, the mobile device 10 can rely on other mobile devices 10, which are also out-of-coverage ($T_0$ in FIG. 2(a)), as "hosts" for their outgoing messages 16 intended for one or more recipients such that when one of the hosts comes back into coverage at $T_1$ as shown in FIG. 2(b) the host mobile device (HMD) can send the outgoing messages on behalf of the originating or "source" mobile device (SMD). It will be appreciated that a mobile device 10 may hereinafter be referred to interchangeably as an HMD or an SMD (with or without a subscript) to distinguish between multiple mobile devices 10 in the same scenario.

Figure 3:
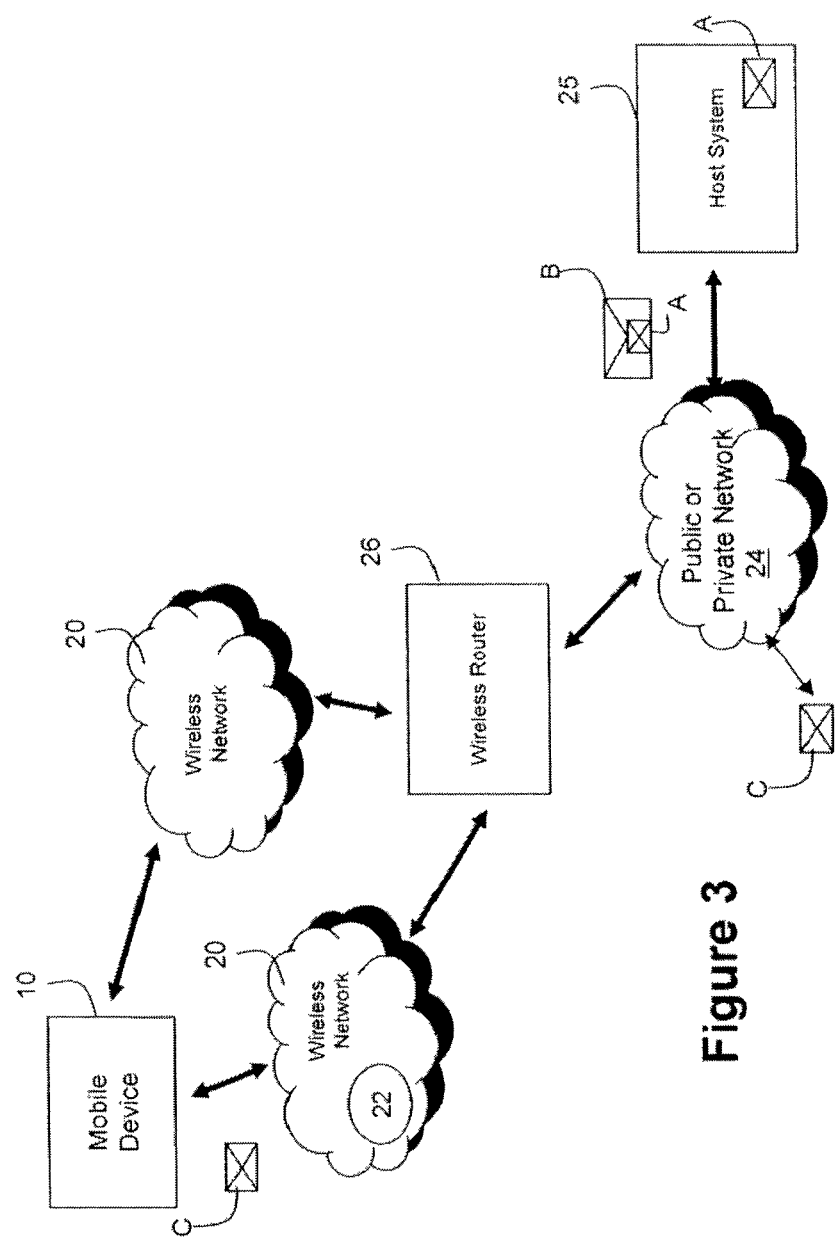
FIG. 3 is a schematic diagram illustrating a system in which data items are pushed from a host system to a mobile device.

The mobile devices 10, including SMDs and HMDs described herein may normally communicate through a wireless network 20, an example of which is shown in FIG. 3. The mobile device 10 can be a two-way communication device with advanced data communication capabilities including the capability to communicate with other mobile devices 10 or computer systems through a network of transceiver stations. The mobile device 10 may also have the capability to allow voice communication. Depending on the functionality provided by the mobile device 10, it may be referred to as a data messaging device, a two-way pager, a cellular telephone with data messaging capabilities, a wireless Internet appliance, or a data communication device (with or without telephony capabilities). The mobile device 10 can also be one that is used in a system that is configured for continuously routing all forms of pushed information from a host system 25 to the mobile device 10. One example of such a system will now be described making reference to FIG. 3.

FIG. 3 is an example system diagram showing the redirection of user data items (such as message A or C) from a corporate enterprise computer system (host system) 25 to the user's mobile device 10 via a wireless router 26. The wireless router 26 provides the wireless connectivity functionality as it acts to both abstract most of the wireless network's 20 complexities, and it also implements features necessary to support pushing data to the mobile device 10. Although not shown, a plurality of mobile devices may access data from the host system 25. In this example, message A in FIG. 3 represents an internal message sent from, e.g. a desktop computer (not shown) within the host system 25, to any number of server computers in the corporate network (e.g. LAN), which may, in general, include a database server, a calendar server, an E-mail server or a voice-mail server.

Message C in FIG. 3 represents an external message from a sender that is not directly connected to the host system 25, such as the user's mobile device 10, some other user's mobile device (not shown), or any user connected to the public or private network 24 (e.g. the Internet). Message C could be e-mail, voice-mail, calendar information, database updates, web-page updates or could even represent a command message from the user's mobile device 10 to the host system 25. The host system 25 may comprise, along with the typical communication links, hardware and software associated with a corporate enterprise computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a corporate firewall.

The mobile device 10 may be adapted for communication within wireless network 20 via wireless links, as required by each wireless network 20 being used. As an illustrative example of the operation for a wireless router 26 shown in FIG. 3, consider a data item A, repackaged in outer envelope B (the packaged data item A now referred to as "data item (A)") and sent to the mobile device 10 from an Application Service Provider (ASP) in the host system 25. Within the ASP is a computer program, similar to a wireless mobility agent, running on any computer in the ASP's environment that is sending requested data items from a data store to a mobile device 10. The mobile-destined data item (A) is routed through the network 24, and through the wireless router's 26 firewall protecting the wireless router 26 (not shown).

Although the above describes the host system 25 as being used within a corporate enterprise network environment, this is just one embodiment of one type of host service that offers push-based messages for a handheld wireless device that is capable of notifying and presenting the data to the user in real-time at the mobile device when data arrives at the host system.

By offering a wireless router 26 (sometimes referred to as a "relay", "message server", "data redirector", etc.), there are a number of major advantages to both the host system 25 and the wireless network 20. The host system 25 in general runs a host service that is considered to be any computer program that is running on one or more computer systems. The host service is said to be running on a host system 25, and one host system 25 can support any number of host services. A host service may or may not be aware of the fact that information is being channeled to mobile devices 10. For example an e-mail or message program 138 (see FIG. 4) might be receiving and processing e-mail while an associated program (e.g. an e-mail wireless mobility agent) is also monitoring the mailbox for the user and forwarding or pushing the same e-mail to a wireless device 10. A host service might also be modified to prepared and exchange information with mobile devices 10 via the wireless router 26, like customer relationship management software. In a third example, there might be a common access to a range of host services. For example a mobility agent might offer a Wireless Access Protocol (WAP) connection to several databases.

Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 10 and wireless network 20, offer push services to standard web-based server systems and allow a host service in a host system 25 to reach the mobile device 10 in many countries.

The host system 25 shown herein can have many methods when establishing a communication link to the wireless router 26. For one skilled in the art of data communications the host system 25 could use connection protocols like TCP/IP, X.25, Frame Relay, ISDN, ATM or many other protocols to establish a point-to-point connection. Over this connection there are several tunneling methods available to package and send the data, some of these include: HTTP/HTML, HTTP/XML, HTTP/Proprietary, FTP, SMTP or some other proprietary data exchange protocol. The type of host systems 25 that might employ the wireless router 26 to perform push could include: field service applications, e-mail services, stock quote services, banking services, stock trading services, field sales applications, advertising messages and many others. This wireless network 20 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 25, or that the host system 25 acquires through the use of intelligent agents, such as data that is received after the host system 25 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 25, the wireless router 26 may implement a set of defined functions. It can be appreciated that one could select many different hardware configurations for the wireless router 26, however, many of the same or similar set of features would likely be present in the different configurations. The wireless router 26 may offer any one or more of the following features for host services: 1) An addressing method so that mobile device 10 traffic can be addressed to a host system 25 without the need for the wireless network 20 to assign an identity to each host system 25; 2) An efficient and authenticated method for the host system 25 to initiate a communication connection to the wireless router 26 for the purposes of opening a communication tunnel to the one or more mobile devices 10 that the host system 25 wishes to communicate with; 3) A reliable method for exchanging data between the host system 25 and the mobile device 10, in a manner consistent with the abilities of the wireless network 20; 4) Providing feedback to the host system 25 when data is delivered, which allows the host system to clean up any wireless delivery queues if necessary, or inform the original sender (user or program) that the data has been delivered to the mobile device 10; 5) Implementation of a wireless network 20 initiated push of services or data to a mobile device 10, from a wireless router 26; and 6) Connect to a wide range of wireless networks 20 and provide a way of tracking the user's location so that a 'follow you anywhere' solution can be provided.

Figure 4:
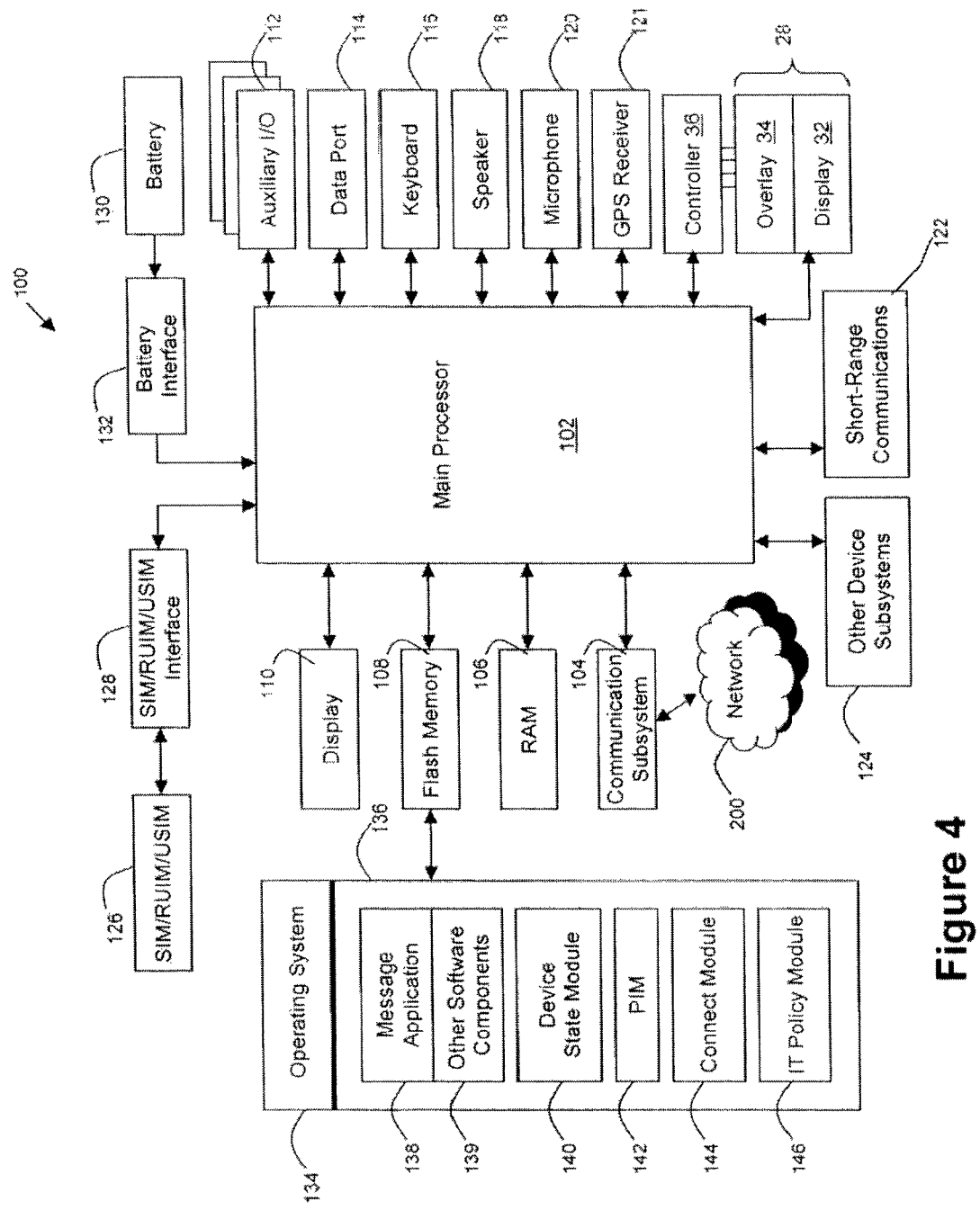
FIG. 4 is a block diagram of an exemplary embodiment of a mobile device.
Figure 5:
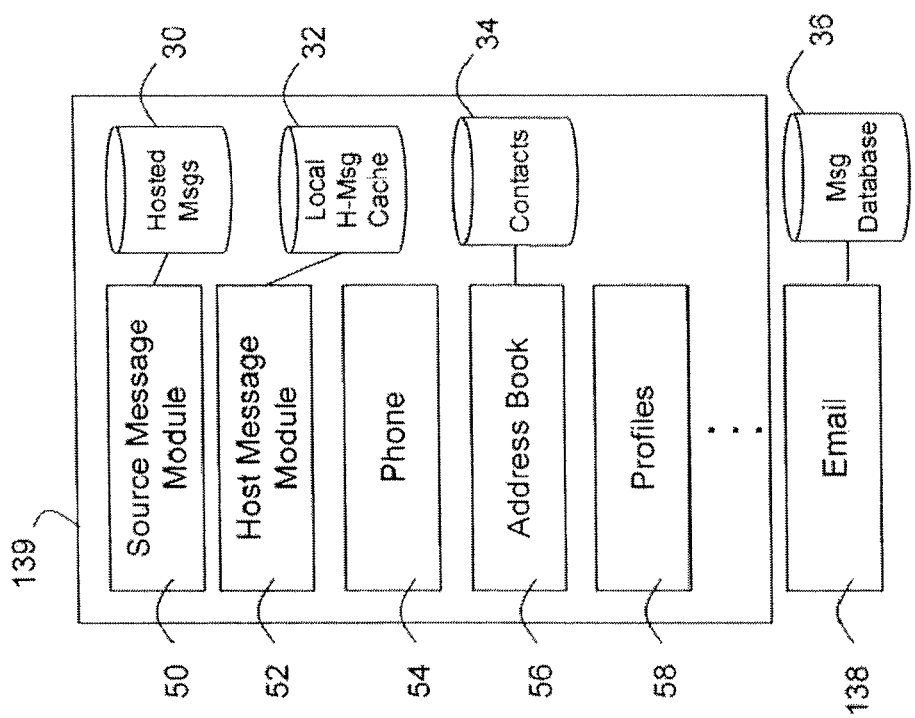
FIG. 5 is a block diagram illustrating exemplary ones of the other software applications and components shown in FIG. 4.

An exemplary configuration for the mobile device 10 is illustrated in FIGS. 4-5. Referring first to FIG. 4, shown therein is a block diagram of an exemplary embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 20. In this exemplary embodiment of the mobile device 10, the communication subsystem 104 is configured in accordance with the GSM and GPRS standards, which are used worldwide. Other communication configurations that are equally applicable are the 3G and 4G networks discussed above. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 20 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124. As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 20, and device-resident functions such as a calculator or task list.

The mobile device 10 can send and receive communication signals over the wireless network 20 after required network registration or activation procedures have been completed. Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 10 is not fully operational for communication with the wireless network 20. Once the SIM/RUIM/USIM 126 is inserted into the SIM/RUIM/USIM interface 128, it is coupled to the main processor 102.

The mobile device 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and managing data items of interest to the user, such as, but not limited to, e-mail, text messages, instant messages, contacts, calendar events, and voice mails, and may interact with the wireless network 20. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc. The additional applications 139 can be loaded onto the mobile device 10 through at least one of the wireless network 20, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use a the touch-sensitive overlay 34 on the display 32 that are part of the touch screen display 28, in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over the wireless network 20 through the communication subsystem 104.

FIG. 5 shows an example of the other software applications and components 139 that may be stored on and used with the mobile device 10. Only examples are shown in FIG. 5 and such examples are not to be considered exhaustive. In this example, a source message module 50, host message module 52, phone application 54, address book 56 and a profiles application 58 are shown to illustrate the various features that may be provided by the mobile device 10. Also shown in FIG. 5 is the message application 138, which in the following will be referred to as an email application 138 for clarity and stores or otherwise has access to a message database 36 for storing incoming and outgoing messages as well as those stored in various folders. It will be appreciated that the various applications may operate independently or may utilize features of other applications. For example, the phone application 54 and email application 138 may use the address book 56 for contact details obtained from a list of contacts 34.

The source message module 50 provides the functionality required in this example for the mobile device 10 to act as an SMD as will be explained in greater detail below. The source message module 50 would be used when the mobile device 10 discovers that it is out-of-coverage and that an HMD is within range via an alternate communication channel, e.g. via short-range communications module 122. The source message module 50 stores or otherwise has access to a hosted messages database 30, which can be used to: store a list of those messages that have been sent to an HMD and thus are currently being "hosted", store the hosted messages themselves to distinguish from messages sent in the normal fashion, or both.

The host message module 52 provides the functionality required in this example for the mobile device 10 to act as an HMD for other mobile devices 10 acting as SMDs as will be explained in greater detail below. The host message module 52 would be used by a mobile device 10 when it is also out-of-coverage and when certain criteria or other permissions are satisfied as also explained in greater detail below. The host message module 52 stores or otherwise has access to a local hosted message (H-Msg) cache 32, which is used to store copies of messages that the HMD is hosting for SMDs to enable the HMD to send the messages on behalf of the SMDs when it comes back into coverage, and upon determining that such messages have not already been sent by the wireless router 26.

It may be noted that a mobile device 10 can be either an SMD or an HMD as shown in FIG. 5, however, the mobile device 10 can be configured to operate only as one or the other as desired. It may also be noted that although the following examples describe a particular mobile device 10 as being either an SMD or an HMD at any given time (for clarity), any of these mobile devices 10 could also be both an SMD and an HMD at the same time, or be neither for the reason that it is rejected by the user or another device.

Figure 6:
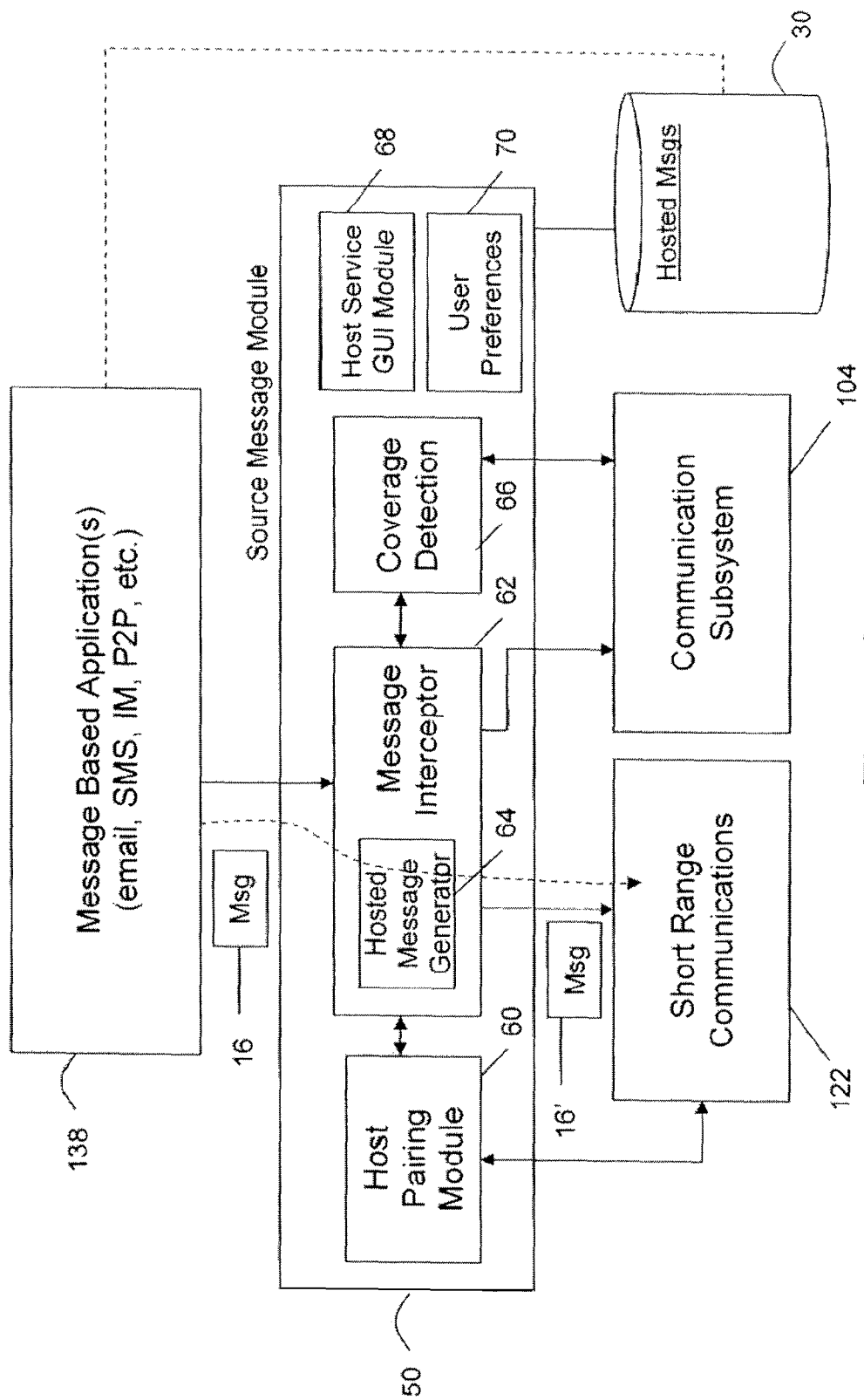
FIG. 6 is a block diagram illustrating an exemplary configuration for the source message module shown in FIG. 5.

Turning now to FIG. 6, further detail of the source message module 50 is shown. The source message module 50 is capable of interposing itself between any one or more of various message-based applications 138, e.g. email, SMS, instant messaging (IM), peer-to-peer (P2P), etc.; and both the short range communications module 122 and the communication subsystem 104; such that it can detect or be instructed to redirect outgoing messages 16 intended for the wireless network 20 to the short range communications module 122 and in turn a potential (or already provisioned) HMD. As such, it can be appreciated that the wireless router 26 shown herein is for illustrative purposes and may be interchanged with other intermediary devices depending on the application. For example, in an SMS application, the wireless router 26 would be embodied as an SMS gateway. Also, it may be noted that the way in which a mobile device 10 is identified will also vary according to the application and may include a personal identification number (PIN), phone number, etc. The source message module 50 comprises a host pairing module 60 which enables the mobile device 10 to become an SMD by determining the existence of one or more HMDs that are also out of coverage but within an applicable range. Based on such pairing, a message interceptor 62 enables the SMD, once paired, to redirect messages intended to be sent via the wireless network 20 via the communication subsystem 104 to the short range communications module 122. It can be appreciated that, as discussed above, the short term communications module 122 can be configured to provide any available and compatible device-to-device or peer-to-peer communications, e.g. short range communication protocols such as Bluetooth®, ad-hoc Wi-Fi, infrared, or adaptations of a long-range protocols, proprietary protocols, etc.

In order to provide the appropriate information to enable the HMD to sent on behalf of the SMD, a hosted message generator 64 can be used to add address fields, perform encapsulation, or any other suitable method for packaging the message 16 to be capable of being used as a hosted message 16'. The source message module 50, as discussed above, has access to the hosted messages database 30 to update its contents as hosted messages 16' are generated and as acknowledgement is received of the delivery thereof. The pairing of a mobile device 10 with a potential HMD can be initiated upon detecting that the mobile device 10 is out of coverage. The coverage status of the mobile device 10 can be determined using a coverage detection module 66, which determines whether connectivity can be achieved with the wireless network 20 via a wireless base station 12.

The source message module 50 may also include a host service GUI module 68 for updating the mobile device UI (described below—see FIG. 10 for an example) to indicate that certain messages are being sent via a host, to alert or prompt the user (or both) regarding use of source message module 50, and to enable a user of the mobile device 10 to enter and store user preferences 70 concerning use of HMDs for sending messages. For example, the GUI module 68 can prompt the user during the pairing process to alert them to the identity of the potential HMD such that certain HMDs can be rejected (e.g. if the corresponding user is unknown). Also, the user can specify certain other mobile devices 10 for automatic pairing, e.g. co-workers, family members, friends, groups/organizations, or other devices specified in a list within the user preferences 70.

Figure 7:
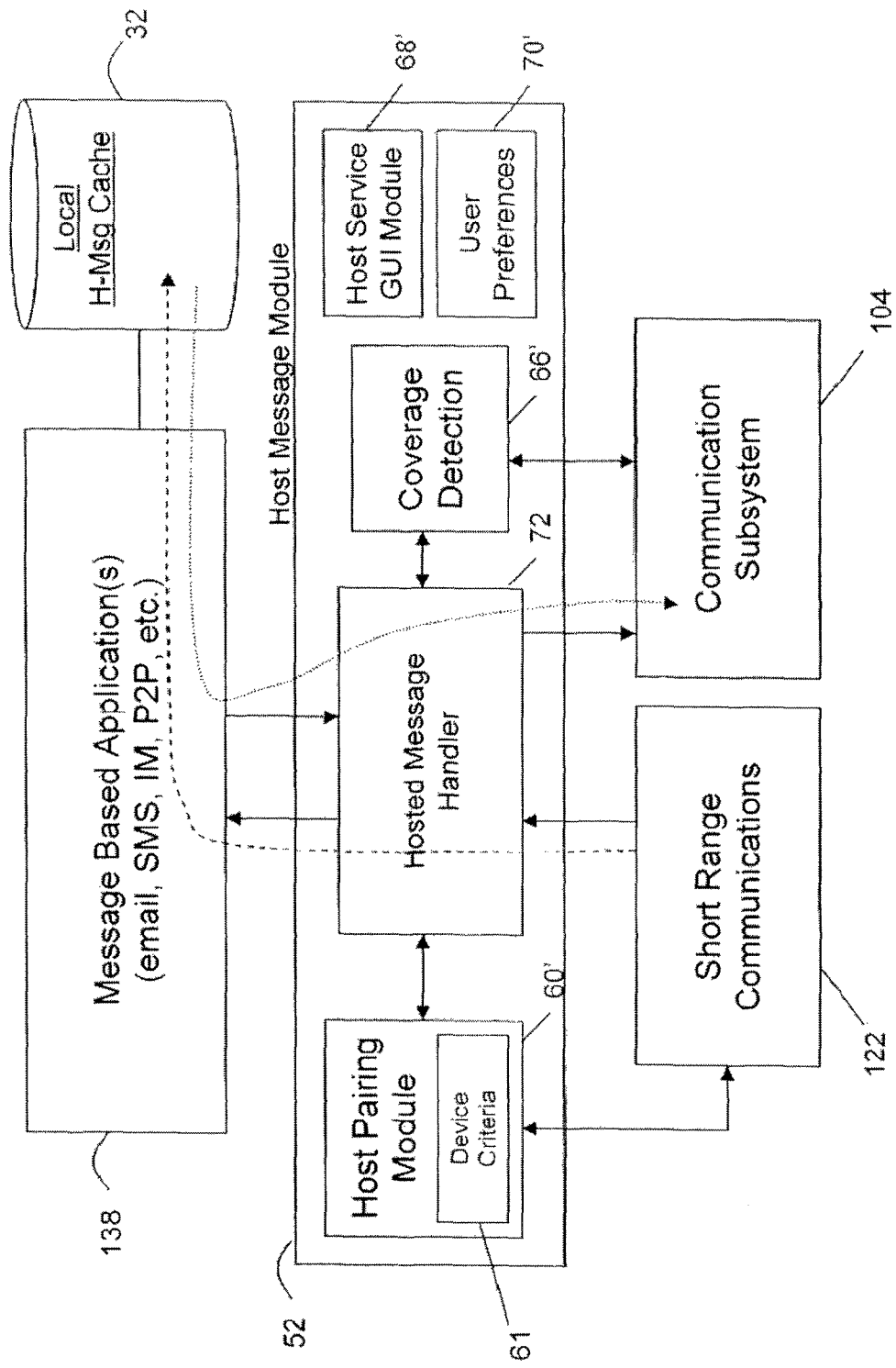
FIG. 7 is a block diagram illustrating an exemplary configuration for the host message module shown in FIG. 5.

Further detail of the host message module 52 is shown in FIG. 7. Similar to the source message module 50, the host message module 52 is capable of interposing itself between the message based application(s) 138 and the short range communications module 122 and the communication subsystem 104. For the host message module 52, hosted messages 16' are obtained or otherwise received through the short range communications module 122 by a hosted message handler 72 in order to then redirect such hosted messages 16' to the local H-msg cache 32 for temporary storage until the HMD comes back into coverage. The HMD, once back in coverage, is then capable of sending the hosted message 16' through the communication subsystem 104 on behalf of the particular SMD. It may be noted that the local H-msg cache 32 may be incorporated into an existing message store such as the msg database 36 and thus utilize an existing mechanism such as an email outbox, or can be a distinct portion of memory that is accessible to the appropriate message based application 138 for sending on behalf of the SMD. Alternatively, the host message module 52 may itself have the capability of sending the hosted message 16' and thus not need to rely on the message based applications 138. Therefore, the hosted messages 16' can be forwarded using any suitable, available, and desirable communication medium to accommodate the capabilities of the mobile device 10.

Similar to the source message module 50, the host message module 52 may include a host pairing module 60' to pair the mobile device 10 with SMD suitors. The host pairing module 60' is configured to perform the complementary operations for pairing an SMD to an HMD as will be explained in greater detail below. The host pairing module 60' includes a set of device criteria 61 which can be referenced during or prior to engaging in a pairing request to determine if the mobile device 10 is suitably capable of acting as an HMD at that time. For example, as will be exemplified below, the mobile device 10 can reference its battery power to ensure it is above a predetermined threshold (to prevent draining battery life); can determine that it is in fact also out-of-coverage by referencing a coverage detection module 66'; and can reference the local H-msg cache 32 to ensure that its size or memory usage is below a certain size threshold (where storage limits are imposed by an IT policy or by the user). This allows the user or a policy to set certain limits to prevent battery drain, excessive memory usage and unnecessary hosting (e.g. where a mesh network would be more applicable).

The host message module 52 also comprises a host service GUI module 68' which is responsible for updating the mobile device UI, prompting and alerting the user of the mobile device 10 during pairing, and any other user interface related operations required to obtain feedback and input from the user and to provide same. A set of user preferences 70' can also be referenced by the host message module 52 which may be the same or in addition to the user preferences 70 relied on by the source message module 70 discussed above. For example, similar to when the mobile device 10 is acting as an SMD, the host message module 52 can reference the user preferences 70' to automatically pair and thus automatically act as an HMD for certain mobile devices 10 such as those associated with co-workers, family, friends, etc.

It can be appreciated that in configurations where a mobile device 10 is capable of being both an SMD and an HMD, the components in FIGS. 6 and 7 with like numerals differing only by a suffix ('), can be implemented as a single module capable of acting for both the host message module 52 and the source message module 50. Similarly, the host message module 52 and source message module 50 can be implemented as a single application or program and the delineations between components is shown only for illustrative purposes.

Figure 8:
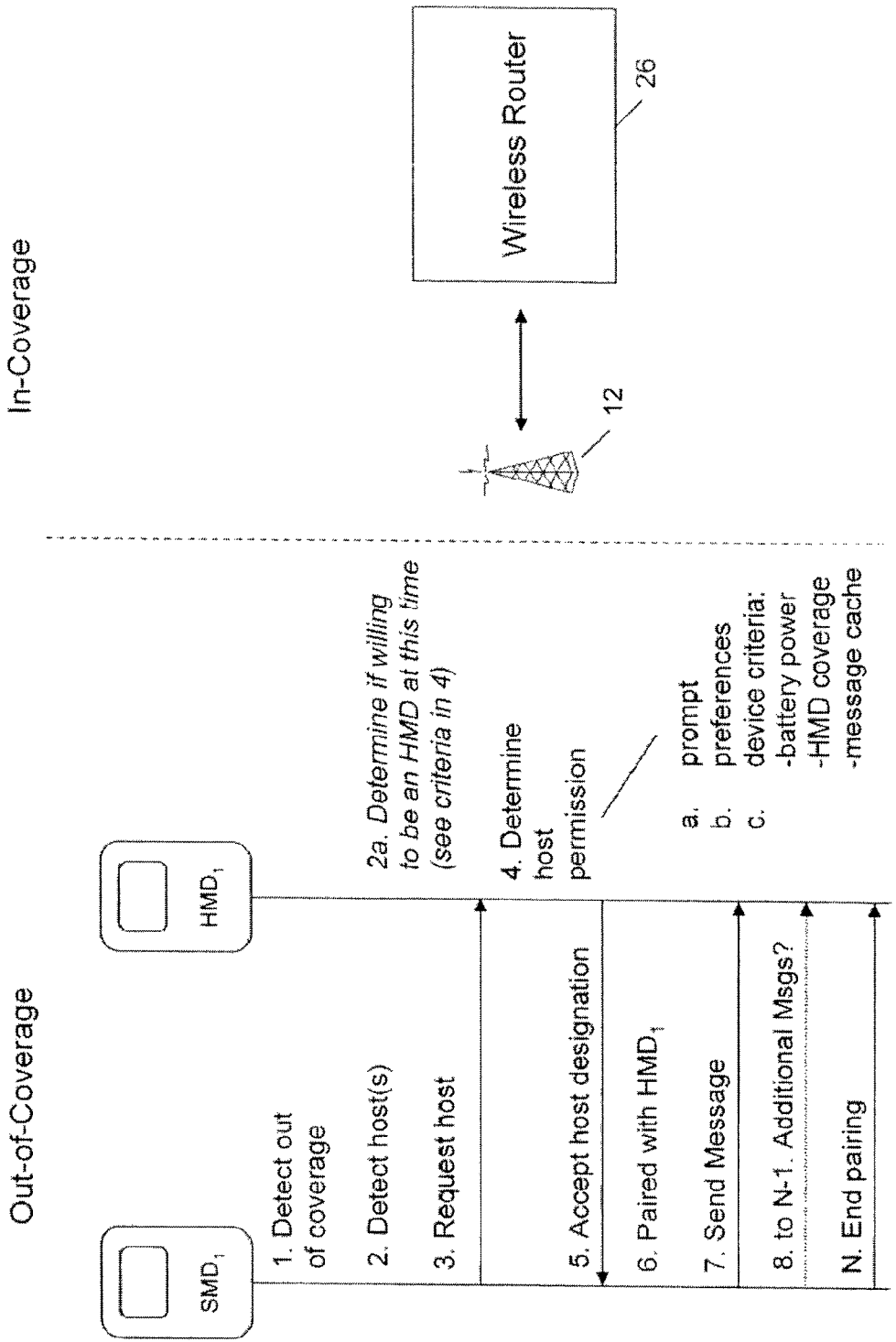
FIG. 8 is a sequence diagram illustrating a pairing procedure between an SMD and an HMD while both devices are out of coverage.

Turning now to FIG. 8, an exemplary pairing procedure is shown between a first mobile device 10, identified as $SMD_1$ and a second mobile device 10, identified as $HMD_1$; both mobile devices 10 being out of coverage and thus incapable of communicating with the wireless base station 12 to send messages 16 via the wireless router 26. The pairing procedure in this example may proceed as follows:

1. Detect out of coverage—the source message module 50 for $SMD_1$ utilizes its coverage detection module 66 to determine that $SMD_1$ is currently out-of-coverage.

2. Detect host(s)—the host pairing module 60 can utilize the short range communications module 122 (e.g. via a Bluetooth® connection) to determine if there are any mobile devices 10 within range to act as an HMD. It can be appreciated that some mobile devices 10 may be capable of communicating with $SMD_1$ but may not be suitable as an HMD, e.g. certain vehicle "hands-free" system that operate only for voice communications. Therefore, operation 2 may include various sub-steps to determine the type of device that is within range and ignore those that are not HMD-compatible. Note that 2a is also shown in FIG. 8 which enables the potential HMD to first determine if it is willing to be an HMD at this time before making itself available to the SMD. For example, if the device is currently in coverage, there is no need to act on behalf of the SMD. Similarly, if the device determines that it is low on battery power or its current message cache 32 is above a threshold, the device may not wish to be an HMD at that time. Operation 4 outlined below provides further detail regarding various criteria that can be employed by the HMD to determine if it should host a particular message 16. As such, it can be appreciated that the criteria shown in 4 can be employed at any suitable stage. For example, the mobile device 10 may decide to shut off their Bluetooth® receiver when they are low on power in order to not engage in a pairing process.

3. Request host—if one or more HMD-compatible mobile devices 10 are found, $SMD_1$ can utilize the host pairing module 60 to send a corresponding request to the HMD, in this example $HMD_1$. The request can be in any suitable format applicable to the communication medium.

4. Determine host permission—the potential HMD, in this example $HMD_1$ completes its portion of the pairing procedure by determining if it is capable of and has permission to act as an HMD for $SMD_1$. Any one or more of the items a, b, c shown in FIG. 8 can be relied on to determine if the necessary permissions are present. a. The HMD can prompt the user to obtain permission. Such a prompt can be provided every time a pairing procedure is initiated or can be used to obtain permission the first time $SMD_1$ engages $HMD_1$ and thereafter an automatic pairing can be saved to the user preferences 70'. The prompt can also be used to provide ancillary information such as whether $SMD_1$ is part of the same organization (e.g. co-worker), or part of the same network, or any other information that can be used to establish trust between $SMD_1$ and $HMD_1$. b. The HMD can also reference user preferences 70' to determine if automatic pairing has been established for $SMD_1$ or if any other predefined preferences are in favour of or against the proposed pairing. c. Performance related criteria such as the battery power, coverage and message cache limits discussed above can also be relied upon to determine if $HMD_1$ is capable of, or allowed to be, an HMD at that time. It can be appreciated that any desired hierarchy or relative weighting can be used to determine which permission criteria outrank others in making the final determination with respect to permissions.

5. Accept host designation—In this example it is assumed that $HMD_1$ has obtained permission (with or without user intervention) and proceeds to send a reply to the request sent at 3 indicating that $HMD_1$ may be used as a host.

6. Paired with $HMD_1$—Upon receiving the reply sent in 5, $SMD_1$ is paired and thus can begin to send hosted messages 16' to $HMD_1$ as its host therefor.

7. Send message—Once the pairing is completed, $SMD_1$ can send a hosted message 16' to $HMD_1$.

8. to N-1. Additional messages—If more than one message is to be sent they can also be provided to $HMD_1$ while the paired connection is maintained. It can be appreciated that additional hosted messages 16' can also be sent at a later time by undergoing another pairing process (if necessary) or if the short range connection is disrupted in the meantime.

N. End pairing—the paired connection ends upon determining that all hosted messages 16' intended to be hosted have been sent, or if a connection is lost (e.g. HMD, moves out of the short range distance applicable to the particular short range communication medium being used).

Turning now to FIG. 9(a), once $SMD_1$ is paired with $HMD_1$, e.g. according to the procedure shown in FIG. 8, a hosted message 16' can be sent via the short range communications module 122, e.g. via Bluetooth® at stage A. $SMD_1$ then adds an entry 88 to its hosted messages database 30 and either stores a copy of the hosted message 16' or a pointer or other address for the hosted message 16' as a related entry 90. This enables $SMD_1$ to access and send the particular hosted message 16' if they reach the coverage area 14 first, or to move the hosted message 16' to a new folder (e.g. a "Sent Items" folder), or delete as necessary, upon determining that it has been sent by an HMD. Once the hosted message 16' has been sent to $HMD_1$, it can store the hosted message 16' in its local H-msg cache 32 as a new entry 88' along with the hosted message 16' itself as a related entry 90'.

One example of a structure for the hosted message 16' is also shown in FIG. 9(a). Since the hosted message 16' can for the purpose of illustration represent any message type, the fields and structure shown in FIG. 9(a) are exemplary only and can be adapted to suit any particular messaging format or structure as required. In this example, a source field 74 is used to identify $SMD_1$ as the source of the hosted message 16' which enables the eventual host to identify the actual "sender" to the ultimate recipient. A host field 76 is also provided which enables the host message 16' to indicate all HMDs to which the hosted message 16' has been sent. This information can be used by the HMDs to sort out priorities (e.g. if many other HMDs have been used and the particular HMD is low on memory, the hosted message 16' can be discarded earlier than otherwise); or can be provided to the wireless router 26 to enable the wireless router 26 to more intelligently handle multiple hosted message transmissions to avoid duplicate messages 16 being sent to the recipient. A message identifier (MSG ID) field 78 is also provided to include a unique identifier, serial number or other identifying feature or signature for the hosted message 16' to enable the wireless router 26 and other HMDs to avoid duplicate transmissions of the same message and to enable feedback to be provided to the SMD. A timestamp field 80 can also be provided to indicate a date and time at which the hosted message 16' was provided to the HMD. Any other necessary or desired field 82 can also be included, e.g. security features, auxiliary information, etc. The fields 74-82 can be considered as part of an existing header (not shown) or can constitute an additional encapsulation layer depending on the application for the message body 84 which is meant to be sent to a particular recipient (details of which would be included in the normal header—not shown).

Also shown in FIG. 9(a) is a global H-msg list 86 which can be stored in memory such as a database at or accessible to the wireless router 26 to enable the wireless router 26 to track when hosted messages 16' have been sent to avoid duplicate transmissions.

Figure 9B:
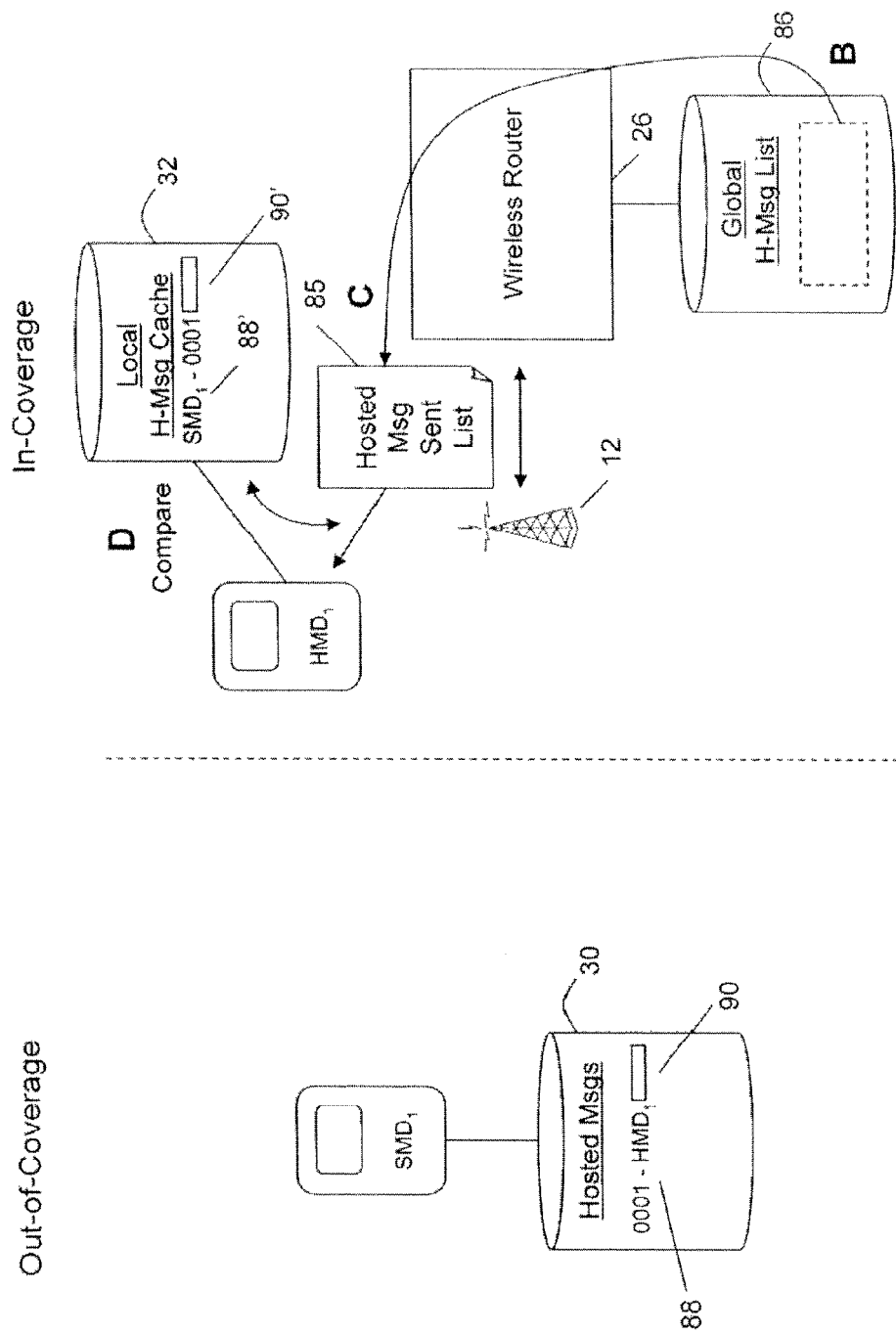

FIG. 9(b) illustrates stages B, C, and D. In this example, $HMD_1$ has entered the coverage area 14 before $SMD_1$ and upon establishing a connection with the wireless router 26, obtains a hosted message sent list 85 from the wireless router 26. The sent list 85 can be obtained by the wireless router 26 (or other network element) detecting that $HMD_1$ is in coverage and automatically sending the sent list 85, or can be initiated by $HMD_1$ requesting the sent list 85 or any other suitable mechanism (e.g. see FIG. 12 discussed below).

Figure 9C:
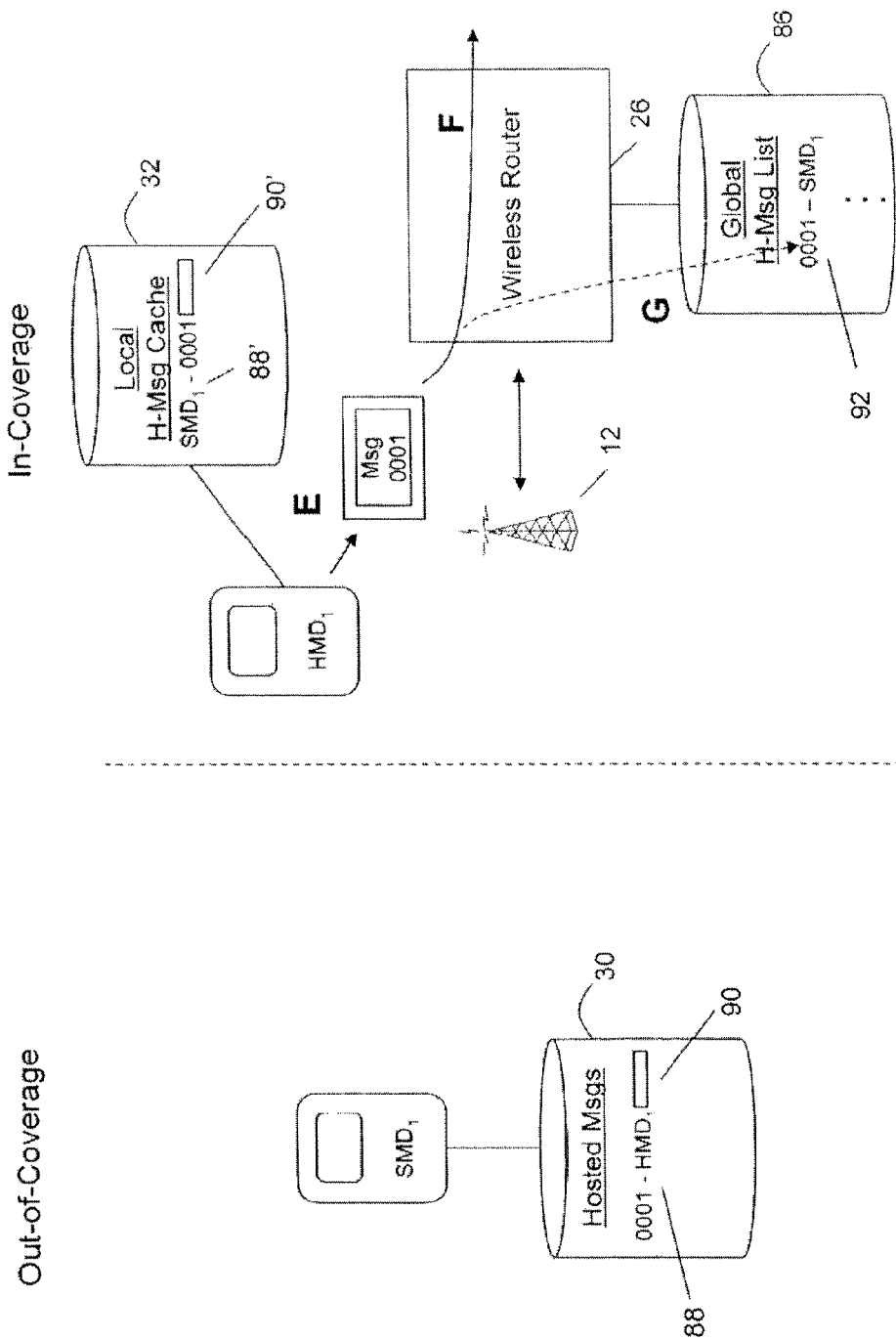

In order to generate the hosted message sent list 85, at stage B, the wireless router 26 accesses the global H-msg list 86 and determines if any hosted messages 16' have been sent through the wireless router 26. The wireless router 26 can filter the sent list 85 based on $HMD_1$ or can simply send an updated list that is provided to any HMD that comes back into coverage. At stage C, the sent list 85 is provided to $HMD_1$, and $HMD_1$ then compares the sent list 85 to the local H-msg cache 32 in stage D to determine if any of the hosted messages 16' it is carrying have already been sent. In this example, the global H-msg list 86 does not include any entries that match one related to message 0001 and thus as shown in FIG. 9(c), at stage E, the hosted message 0001 can be sent via the wireless router 26 at stage F and the global H-msg list updated with a new entry 92 at stage G.

Figure 9D:
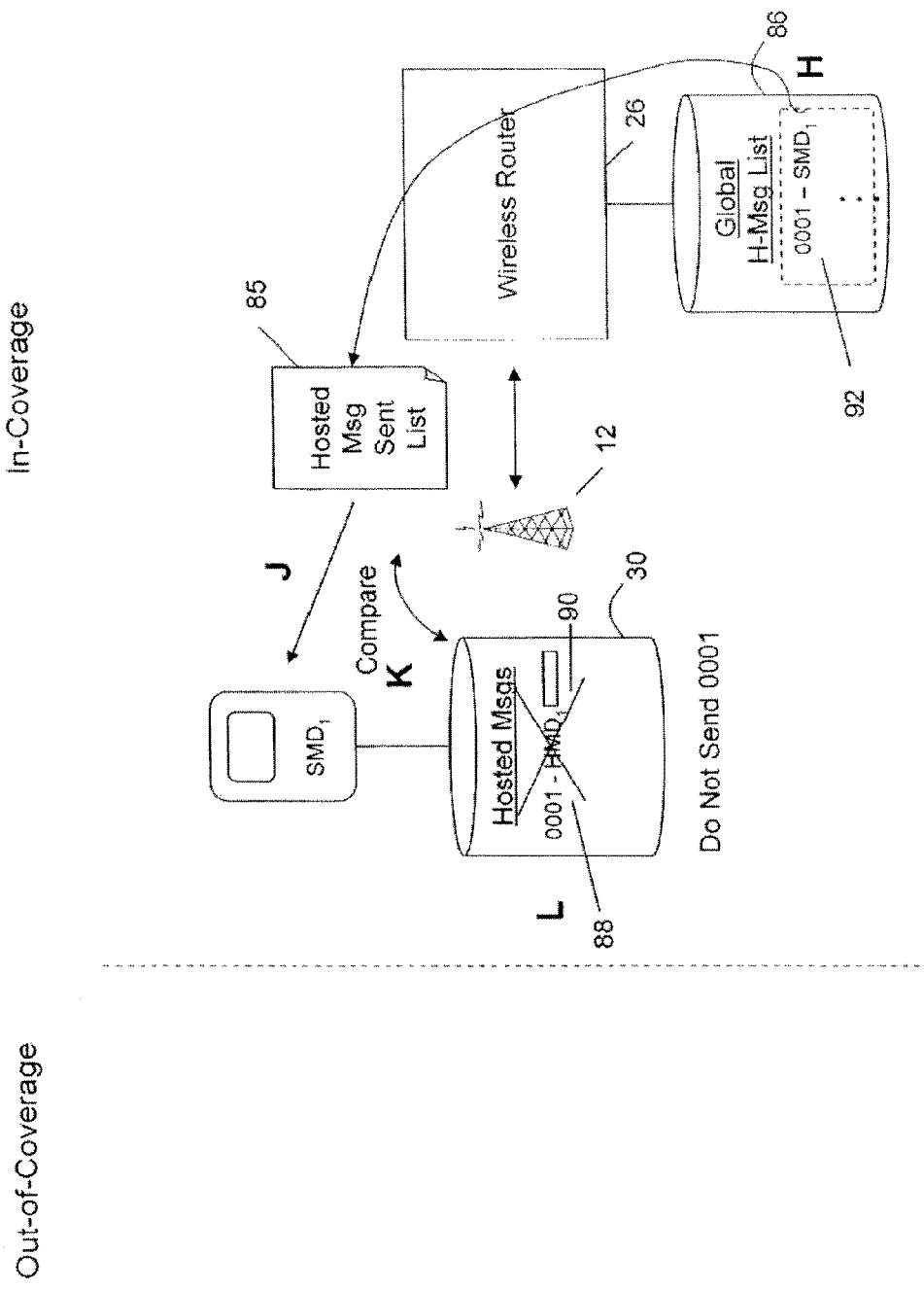

Turning now to FIG. 9(d), once the message 0001 has been sent, there is no need for $SMD_1$ to also send message 0001. Therefore, once $SMD_1$ enters the coverage area 14 as shown, it can obtain a current version of the hosted message sent list 85, which now includes information pertaining to the transmission of message 0001 by $HMD_1$. At stage H, the wireless router 26 generates the sent list 85 to include an identification of message 0001 from $SMD_1$ and at stage J the sent list 85 is provided to $SMD_1$. At stage K, $SMD_1$ compares the sent list 85 to its list and other information in the hosted messages database 30, and determines at stage L that message 0001 should not be sent as such a transmission would be a duplicate. It can be appreciated from FIG. 9(d) that by tracking which hosted messages 16' have been transmitted through the wireless router 26 (and by which mobile device 10), and by providing this information to the mobile device 10 (whether SMD or HMD) upon entering coverage area 14, only hosted messages 16' that have not yet been sent are processed further by $SMD_1$. Information pertaining to which mobile device 10 sent the hosted message 16' can be used for auditing purposes or a credit based system, e.g. where a service provider offers free minutes or other services for participating in the SMD-HMD scheme.

As discussed above, the host service GUI module 68 can be used to update the mobile device UI to enable a user of the mobile device 10 to distinguish between messages 16 sent while in coverage, and hosted messages 16' sent either by an HMD or when the SMD enters the coverage area 14 after pairing with at least one HMD. FIG. 10(a) illustrates an exemplary message application GUI 94 comprising a list of sent and received email message entries 95. In this example, each entry comprises a corresponding graphical indicator 96, which is used to distinguish between, for example, opened and unopened email, and between sent and received email. In this example an envelope icon is used to denote messages 16 from another mobile device 10 with opened/viewed messages 16 having an opened envelope icon. For hosted messages 16', as shown in FIG. 10(*a*), a distinct graphical indicator 97 pertaining to a hosted message is used to distinguish between messages 16 and hosted messages 16'. In this example, an "H" is shown to indicate that the message 16' has been provided to one or more HMDs but confirmation has not yet been received that it has been sent. The GUI 94 seen in FIG. 10(*a*) may be updated as such once the hosted message 16' has been sent to the HMD as shown in FIG. 9(*a*) and until $SMD_1$ enters the coverage area 14 in FIG. 9(*d*). At this point, upon determining that $HMD_1$ has sent the message, the GUI 94 can be updated as shown in FIG. 10(*b*) to indicate a sent message (e.g. using a check mark) but with an additional "H" to distinguish it from another sent message seen further down in the message list. It can be appreciated that any suitable modification to the graphical indicators can be implemented. For example, if $SMD_1$ had entered coverage first and sent the message marked with an H in FIG. 10(*a*), the GUI 94 in FIG. 10(*b*) could instead be modified to include the normal check mark without an H to indicate that the source of the message 16 actually sent the message 16. Similarly, the distinct graphical indicator 97 can be of a different character or graphic and can include more information such as a specific identifier for a specific host or if multiple hosts are being used, indicating the number of hosts carrying the hosted message 16'.

FIGS. 10(*c*) and 10(*d*) illustrate exemplary GUIs 94 at an HMD. In FIG. 10(*c*), similar to the SMD, the user of the HMD can view a graphical indicator 97' distinguishing a message being carried by the HMD for the SMD from normal messages sent or received by the HMD. In this example, an "S" is used to indicate that the message time stamped "12:24p" is actually originating from $SMD_1$. It can be appreciated that any graphical indicator that distinguishes from other messages can be used, e.g. a picture or graphic associated with the SMD, the SMD's initials, etc. FIG. 10(*d*) illustrates that the HMD, instead of or in addition to inserting hosted messages 16' into its own message GUI 94, can have a separate hosted messages outbox 94' which provides a complete list of those messages 97' currently being carried as well as those messages 99 that have already been sent. The GUI 94' enables the HMD to conveniently determine how full its H-Msg cache 32 is, as well as how many SMDs it is acting on behalf of. It can be appreciated that the GUI 94' can also be a filtered or folder view of a main message GUI 94 shown in FIG. 10(*c*). As can be seen in FIGS. 10(*c*) and 10(*d*), details of the message such as subject and content should not be viewable by the HMD for security purposes and thus it will be appreciated that the hosted messages 16' should remain encrypted whilst being carried by an HMD to ensure privacy. In some embodiments, the SMD may include an option to allow an HMD to read a hosted message 16' by decrypting the message prior to sending it to the HMD.

Figure 11A:
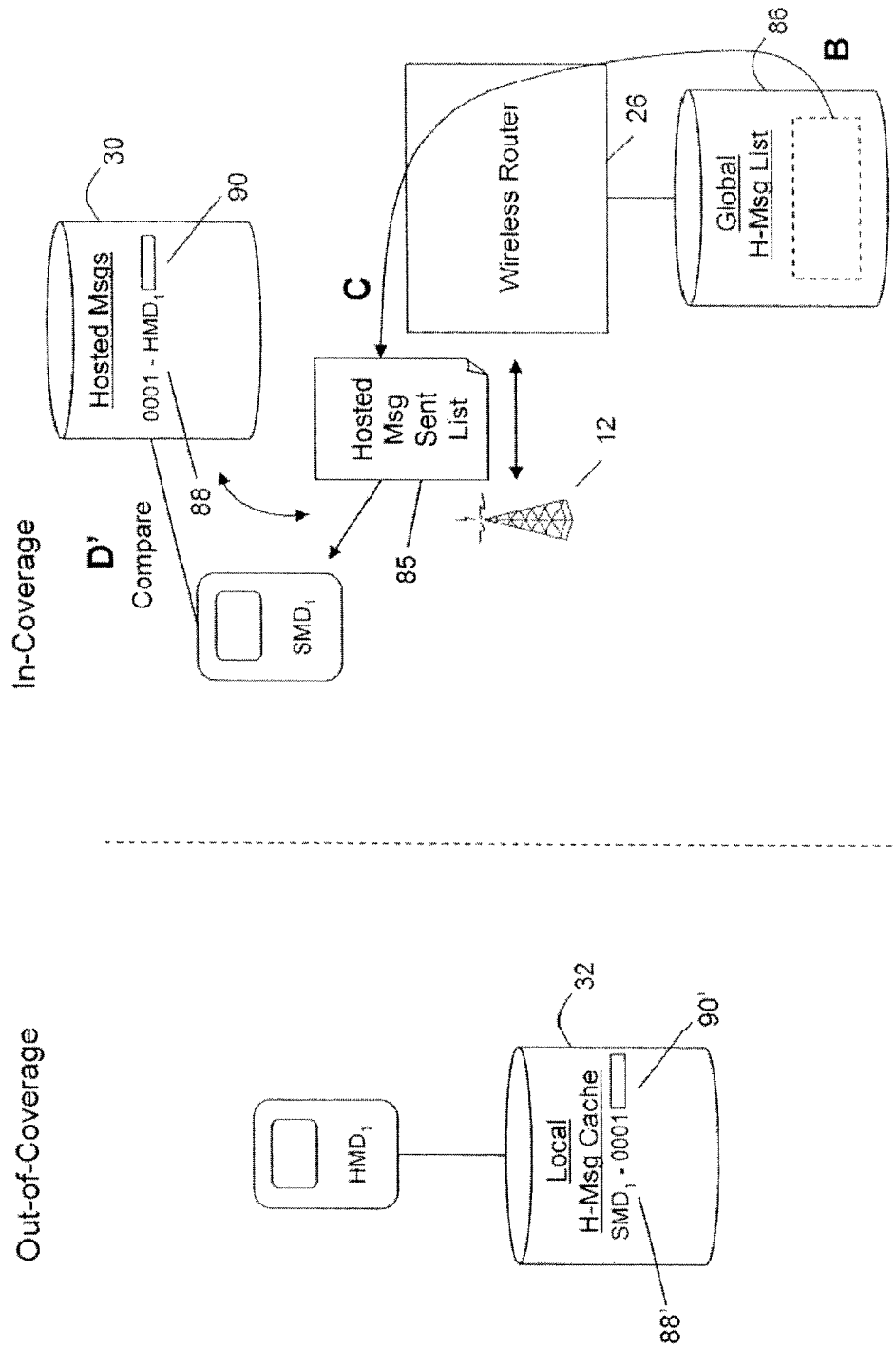
FIGS. 11(a) through 11(c) are flow diagrams illustrating an exemplary scenario wherein an SMD sends a message to an HMD but enters coverage before the HMD.
Figure 11B:
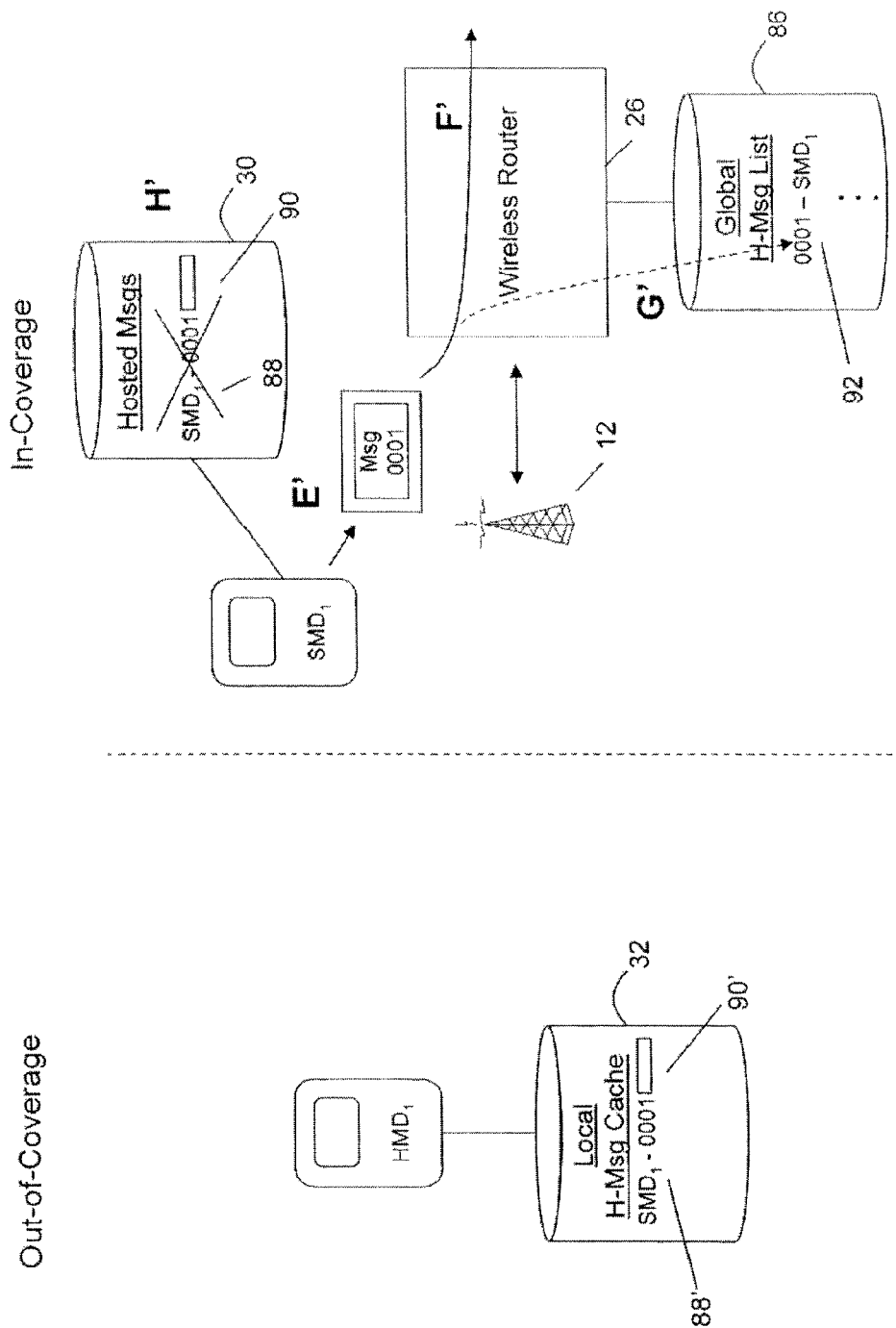
Figure 11C:
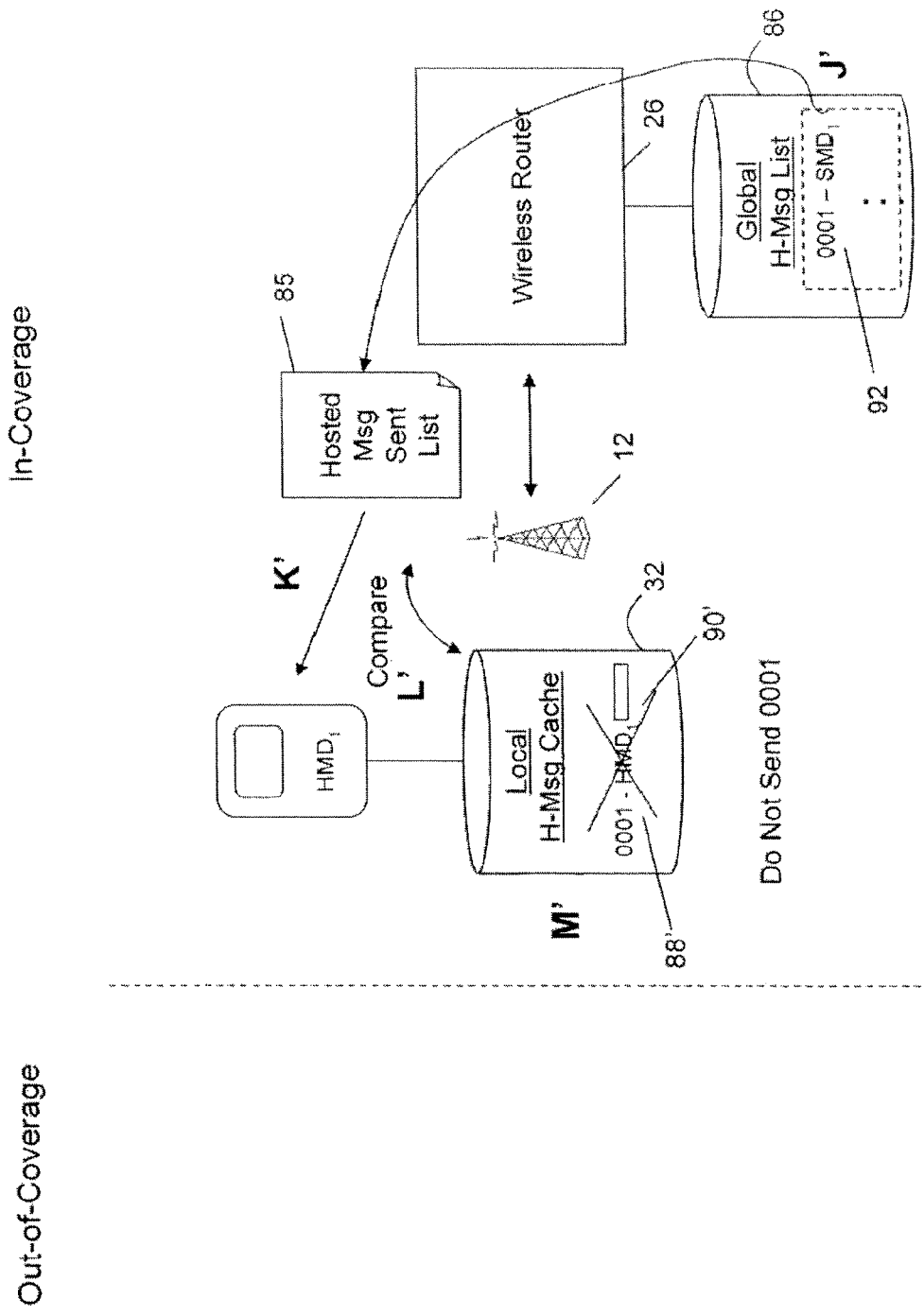

Turning now to FIG. 11(*a*) an alternative scenario carrying on from FIG. 9(*a*) is shown wherein $SMD_1$ instead enters coverage before $HMD_1$. In this example, stages B and C are similar to those shown in FIG. 9(*b*) but stage D' represents a comparison by $SMD_1$ between the hosted message sent list 85 and the hosted messages database 30. As shown in FIG. 11(*b*), SMD, determines that message 0001 has not yet been sent and at stage E' sends message 0001 via the wireless router 26 at stage F' and the global H-msg list 86 is updated as before at stage G'. Stage H' indicates that $SMD_1$ updates its hosted messages database 30 to indicate that message 0001 has been sent (and may update the GUI 94, etc.). Next, as seen in FIG. 11(*c*), when $HMD_1$ comes back into coverage, the wireless router 26 having prepared the hosted message sent list 85 to include an entry 92 pertaining to message 0001, provides the hosted message sent list 85 accordingly at stage K'. HMD, then performs a comparison at stage L' with its local H-msg cache 32 and at stage M' would determine that message 0001 has already been sent and thus does not need to send message 0001 and can delete it from its local H-msg cache 32.

Figure 12A:
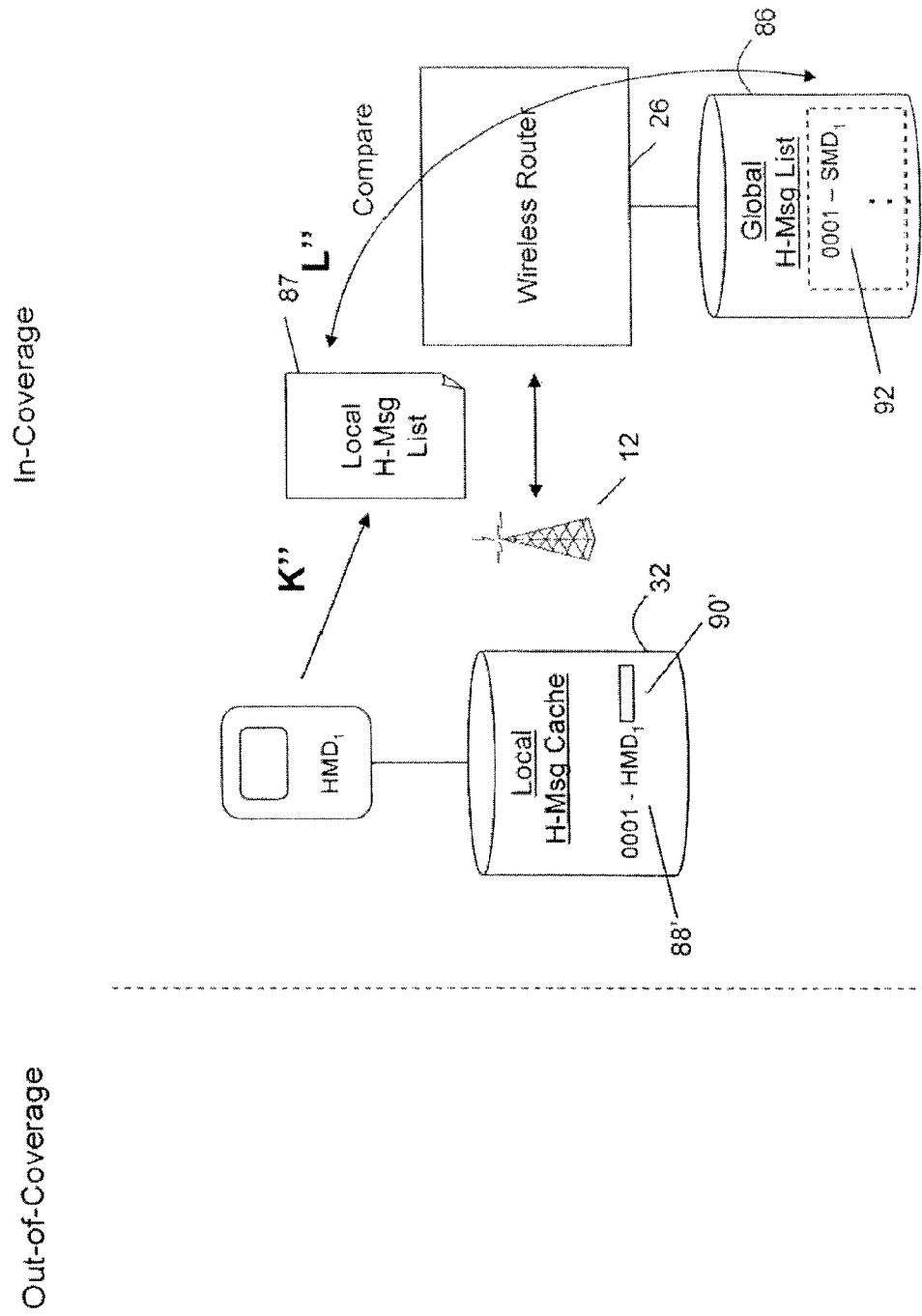
FIGS. 12(a) and 12(b) are flow diagrams illustrating an alternative embodiment for resolving duplicate delivery of hosted messages.
Figure 12B:
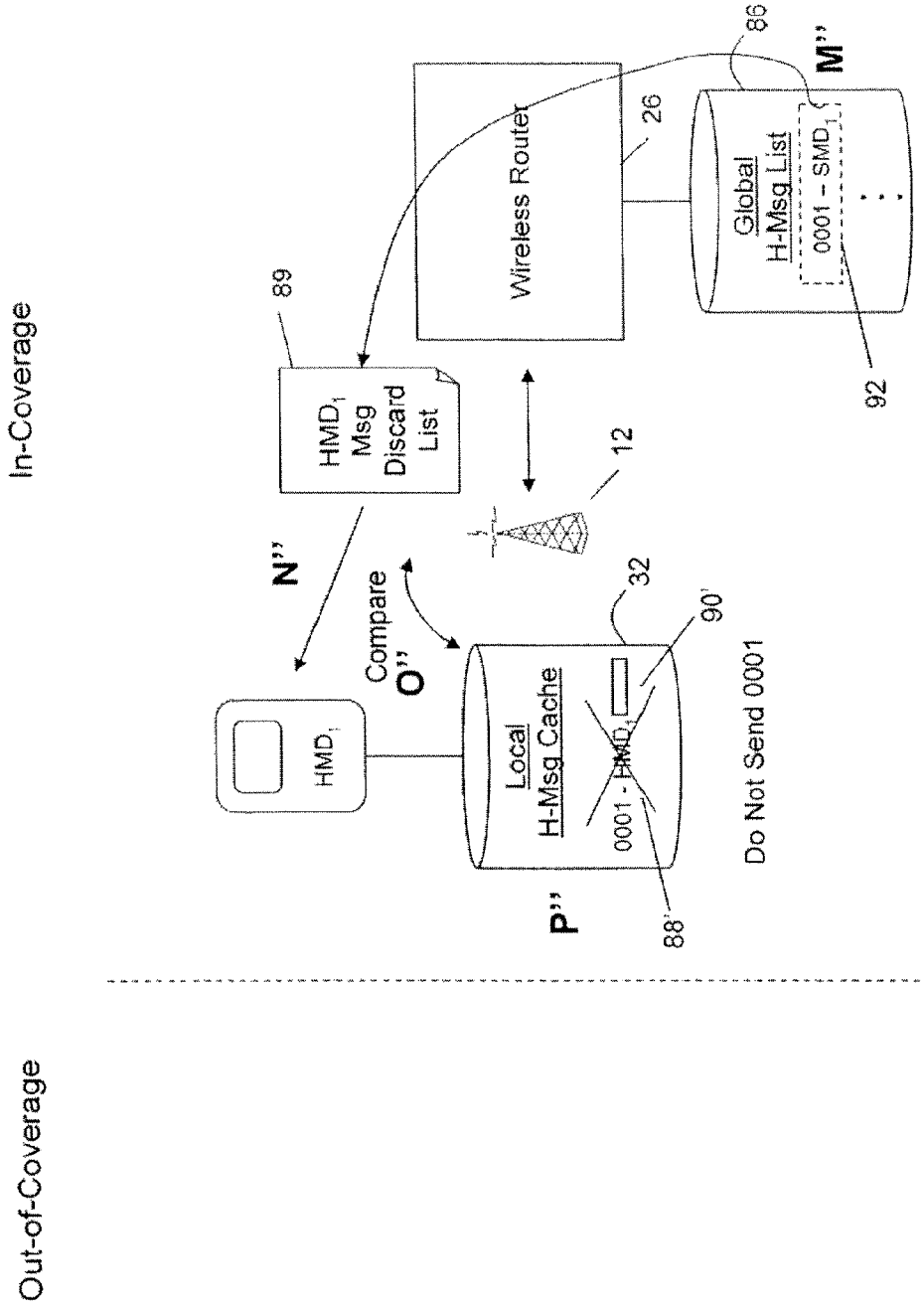

In another embodiment shown in FIG. 12(*a*), the HMD (or SMD) can provide meaningful information to the wireless router 26 upon coming into coverage to enable a filtered list or reply to this meaningful information to be generated by the wireless router 26 rather than a master list. In this embodiment, at stage K", a local H-msg list 87 is provided by $HMD_1$ to the wireless router 26, the local H-msg list 87 comprising a list of the hosted messages 16' that $HMD_1$ currently carries. Using the local H-msg list 87, the wireless router 26 can, at stage L", compare the list 87 to its global H-msg list 86 to determine if any of the hosted messages 16' carried by $HMD_1$ have already been sent. This determination can be made in any suitable manner depending on the nature of the list 86 kept by the wireless router 26. For example, each entry may have a flag indicating whether or not a particular hosted message 16' has been sent. However, if no additional HMDs or the SMD have yet returned to coverage, the wireless router 26 may not yet know of the existence of certain hosted messages 16'. In that case, the global H-msg list 86 may only list those hosted messages 16' that have been sent and thus the absence of any entries from the local H-msg list 87 would indicate that those hosted messages 16' (or the original messages 16) have not yet been processed by the wireless router 26. In this way, as shown in FIG. 12(*b*), at stage M", the wireless router 26 can identify those hosted messages 16' that have already been sent and at step N" provide an $HMD_1$ message discard list 89 to $HMD_1$ which is specific thereto. The message discard list 89 in this example would list those entries 92 found in the global H-msg list 86 that match those listed in the local H-msg list 87.

At stage O", $HMD_1$ can compare the message discard list 89 with the local H-msg cache 32 and determine which hosted messages 16' to send and those to discard as shown in stage P". In this example, it is determined that message 0001 has already been sent and thus this message does not need to be sent by $HMD_1$. It can be seen that by exchanging information with the wireless router 26 upon coming back into coverage, the mobile device 10, whether acting as an HMD or an SMD, can synchronize its data with the wireless router 26 and avoid sending unnecessary messages 16 thus minimizing bandwidth waste.

In other embodiments (not shown), alternative information or data in various formats can be provided instead of the local H-Msg list 87. For example, the HMD, when coming back into coverage, may send truncated messages comprising at least a message ID that indicates to the wireless router 26 which hosted messages 16' it is carrying. In this embodiment, the wireless router 26 may then determine if the messages 16 associated with the corresponding message IDs have already been sent, e.g. by referencing a database or record similar to the global H-Msg list 86. The wireless router 26 may then include in an acknowledgement of the truncated message whether or not the message 16 has already been sent, which the HMD can then use to determine whether it should send the hosted message 16' or to discard it. Alternatively, the HMD can send the hosted messages 16' themselves to the wireless router 26 upon coming into coverage and have the wireless router 26 forward or block/discard messages according to information it has retained thus applying a filter at the wireless router 26 and discarding duplicate messages 16 accordingly. Such an alternative may be particularly advantageous where operations at the mobile device 10 are to be minimized or where the number of hosted messages 16' carried by a mobile device 10 is relatively low (e.g. according to a threshold). The control of hosted messages 16' to avoid duplicates can therefore be handled in many different ways according to the application and the requirements of the mobile device 10 and the wireless router 26.

Figure 13B:
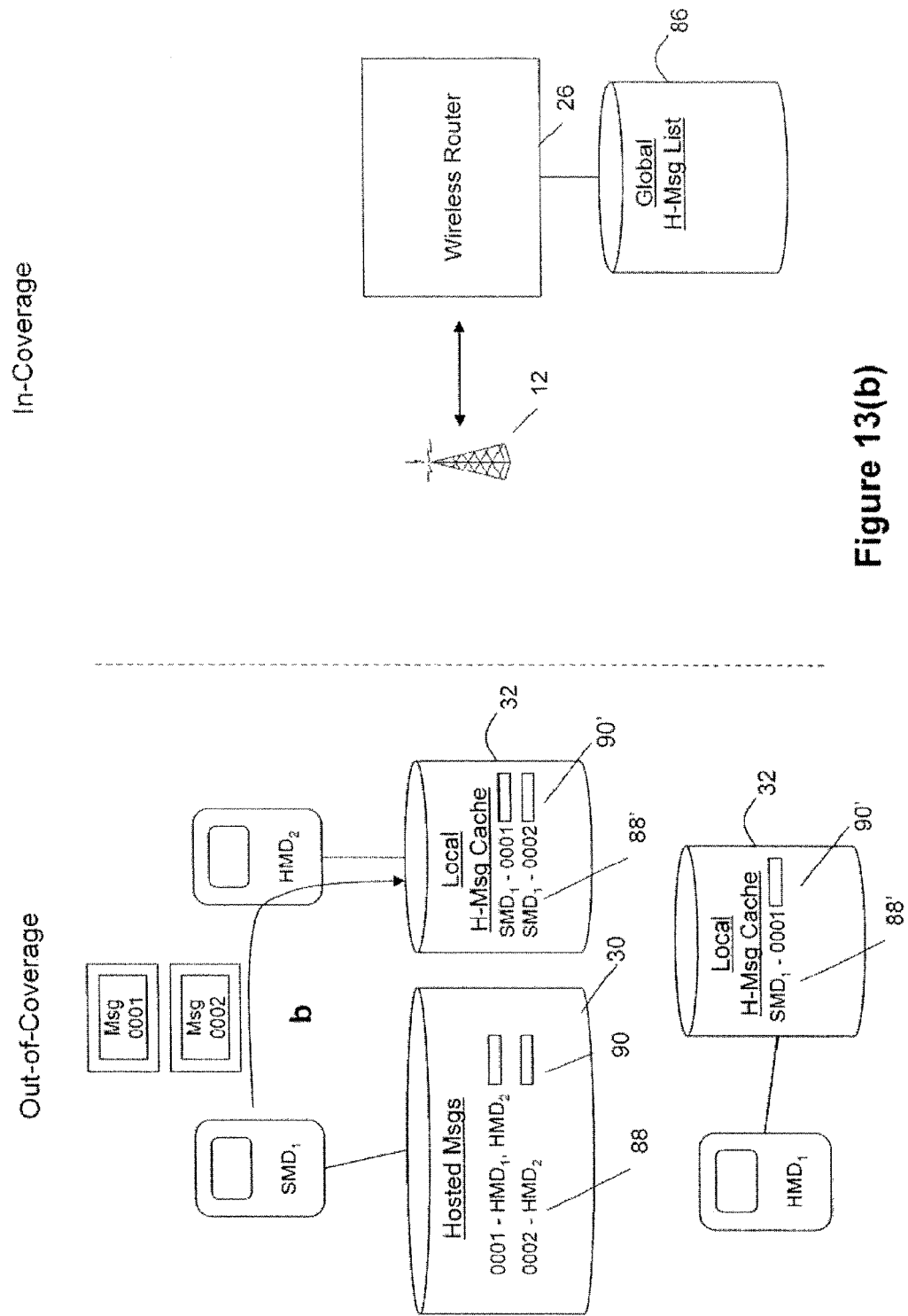

Turning now to FIG. 13(a), an additional embodiment is shown wherein $SMD_1$ distributes a plurality of hosted mes 16' to a plurality of HMDs. FIG. 13(a) is similar to FIG. 9(a) wherein message 0001 is provided to $HMD_1$ in stage a and thus details thereof need not be reiterated. Referring next to FIG. 13(b), at stage b, which in this example is at some time later than stage a, two hosted messages 16', namely message 0001 and a new message 0002 are provided to an additional HMD, namely $HMD_2$. From FIG. 13(b) it may be noted that $HMD_2$ updates its local H-msg cache 32 to include both message 0001 and message 0002. Also, $SMD_1$ may update its hosted message list 30 to indicate that message 0001 has been provided to both $HMD_1$ and $HMD_2$ whereas message 0002 has been provided to only $HMD_2$. As will be shown in FIGS. 13(c) through 13(f), despite having different message sets in their respective local H-msg caches 32, an exchange of information with the wireless router 26 upon coming back into coverage enables both $HMD_1$ and $HMD_2$, as well as $SMD_1$ to avoid sending duplicate messages. In this way, $SMD_1$ can rely on more than one HMD encountered at different times to carry hosted messages 16' back into coverage and send them on its behalf.

Figure 13C:
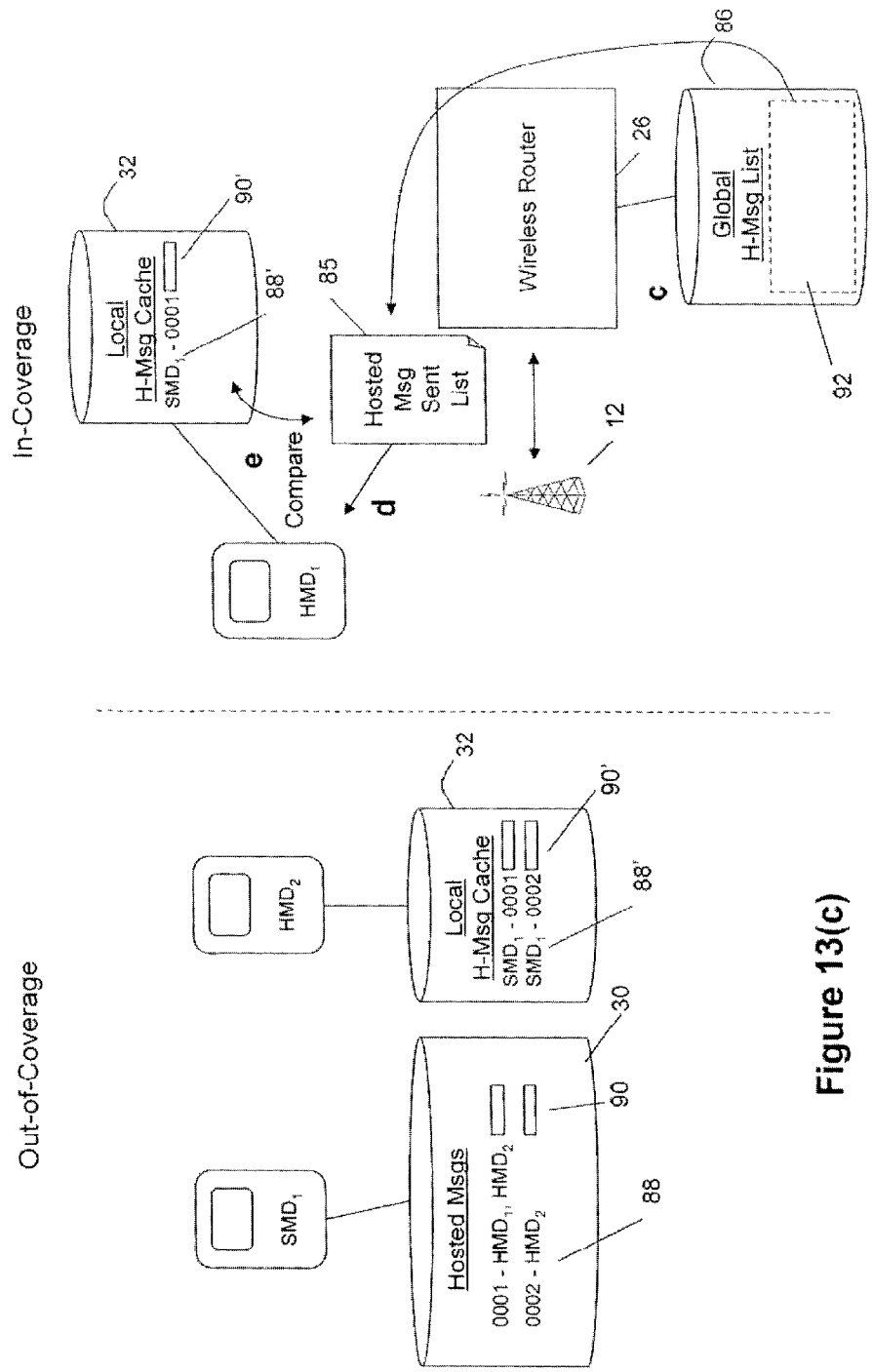
Figure 13D:
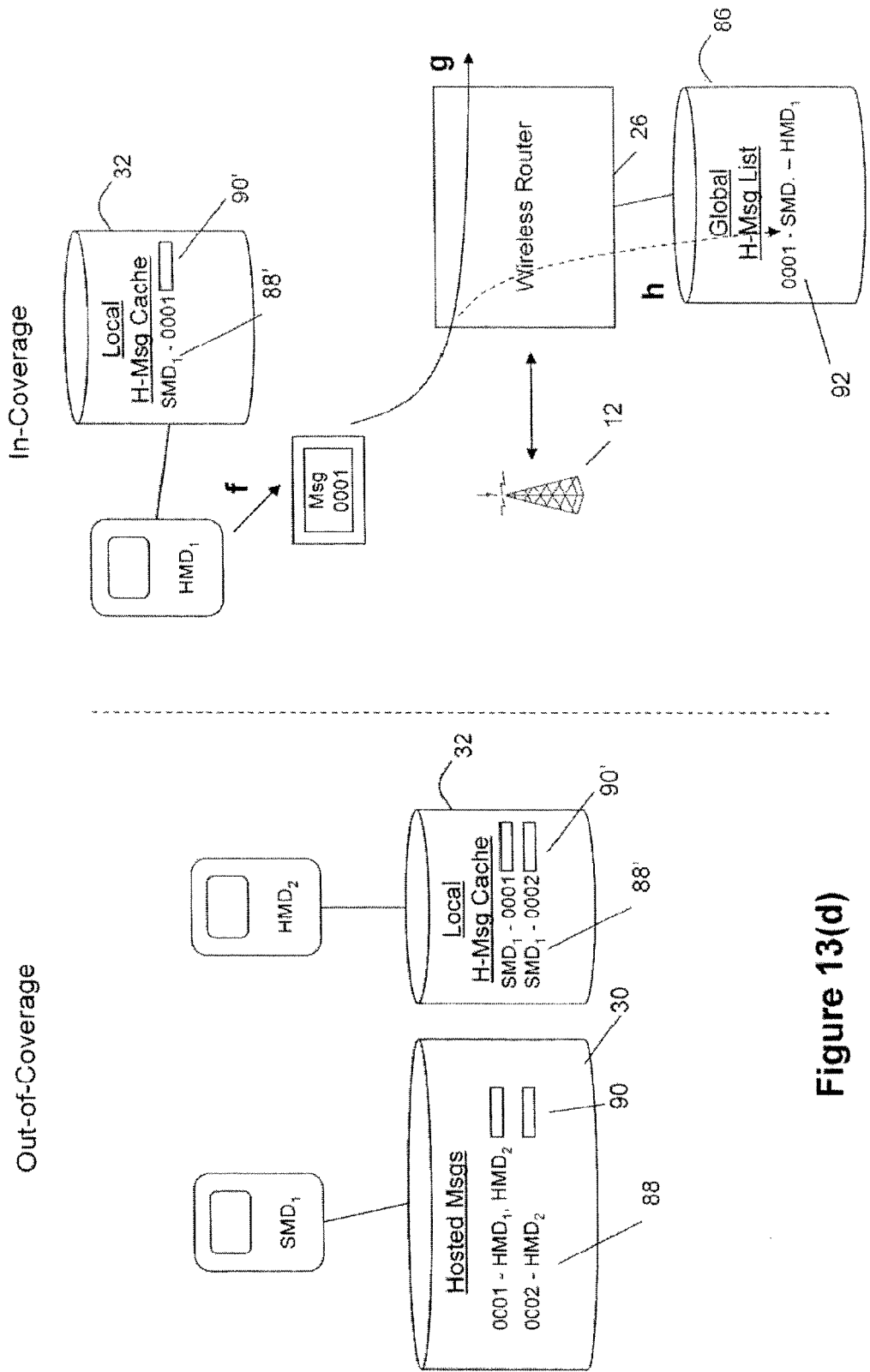
Figure 13E:
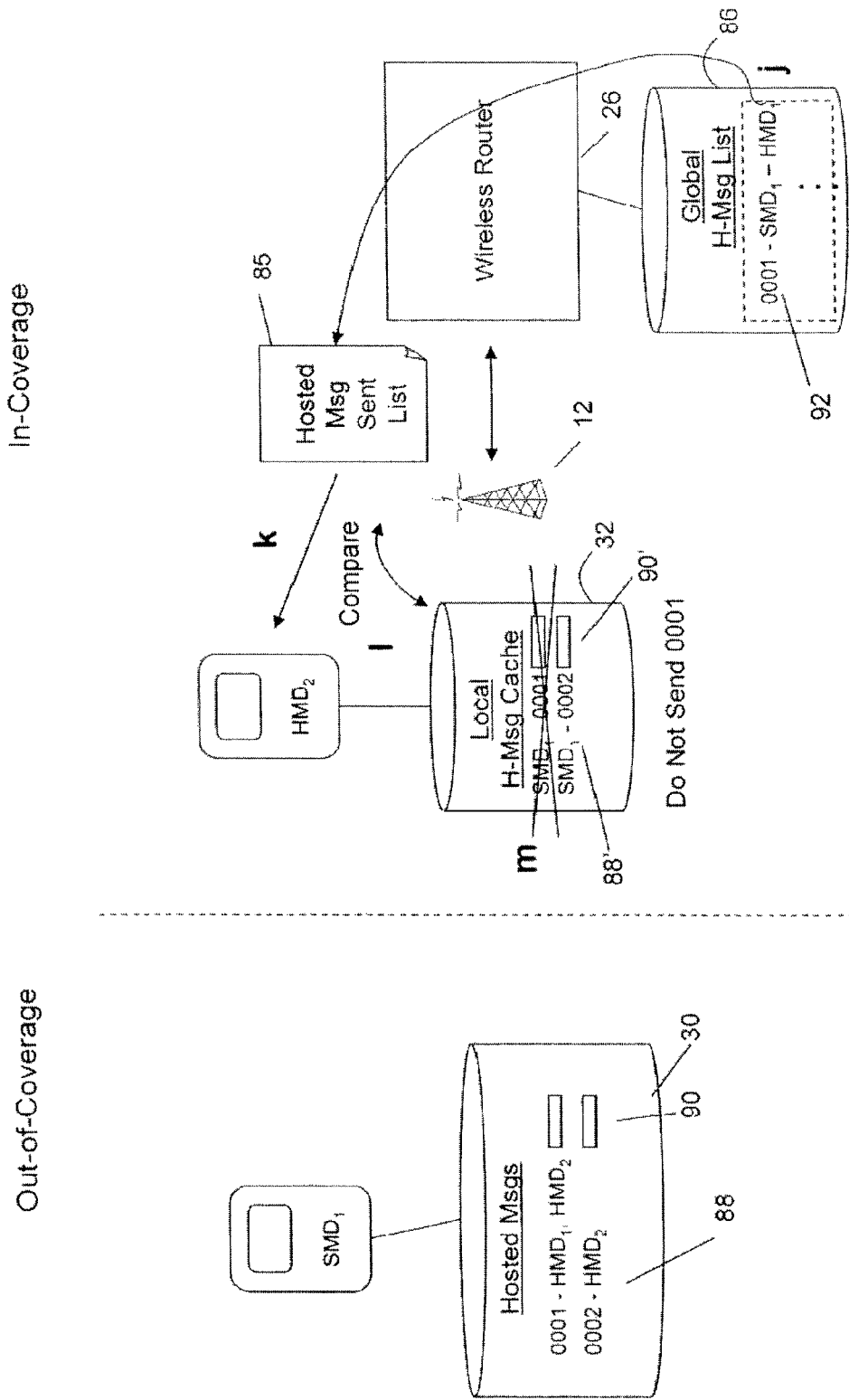
Figure 13F:
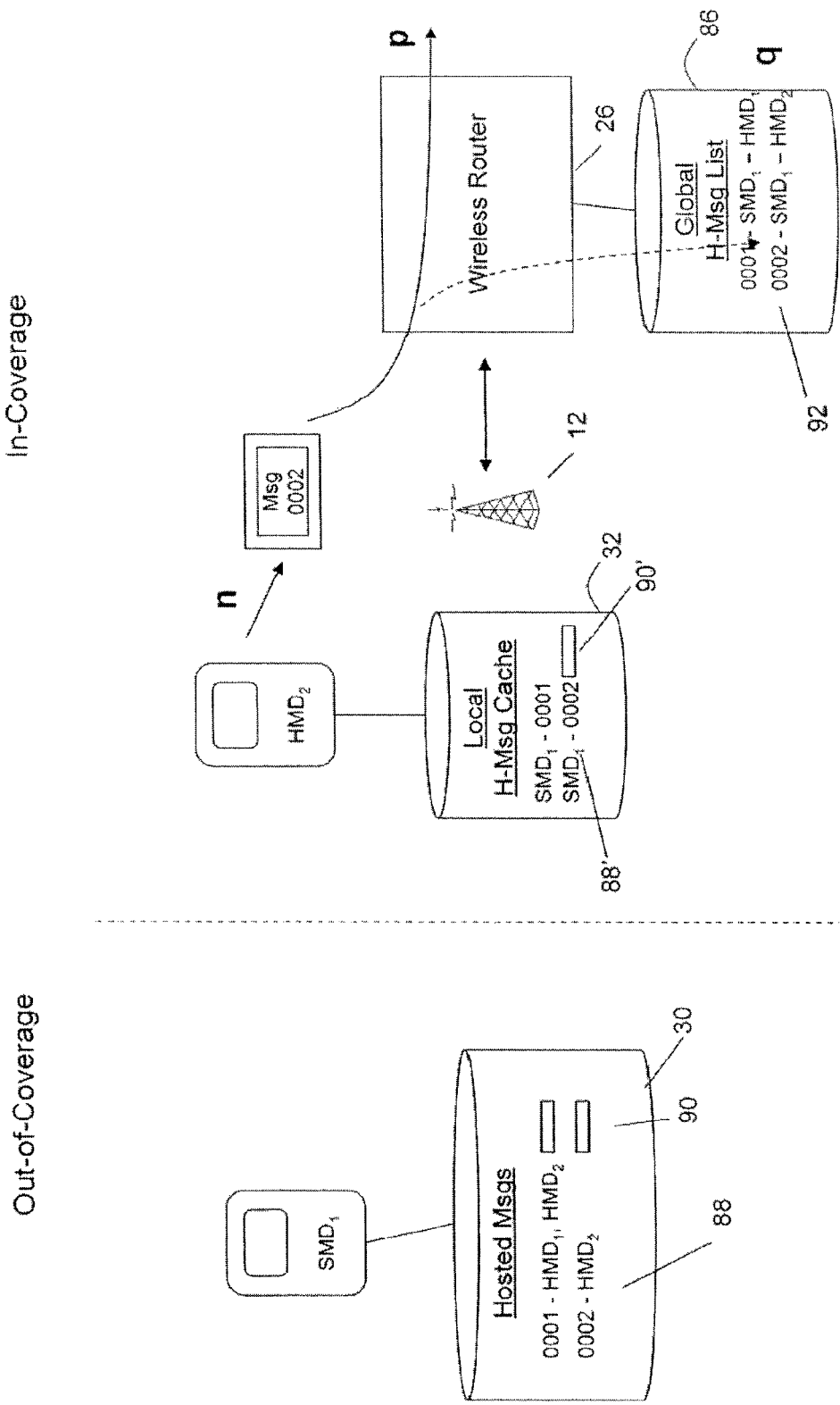

Turning next to FIG. 13(c), at stage c, upon determining that $HMD_1$ is back in coverage, the wireless router 26 references the global H-msg list 86, which in this example does not include any hosted messages 16' being carried by $HMD_1$. The hosted message sent list 85 is then sent to $HMD_1$ at stage d and as exemplified above, is compared to the local H-msg cache 32 in stage e and at stage e, $HMD_1$ would determine that message 0001 has not yet been sent. Therefore, at stage f, shown in FIG. 13(d), $HMD_1$ would send message 0001 to the wireless router 26. The wireless router 26 sends message 0001 to the one or more corresponding intended recipients at stage g and updates its global H-msg list 86 at stage h. As shown in FIG. 13(e), when $HMD_2$ comes back into coverage, the wireless router 26 would include at stage j, information indicating that message 0001 has been sent such that the hosted message sent list 85 sent at stage k includes such information. At stage I, $HMD_2$ compares the hosted message sent list 85 to the local H-msg cache 32 and at stage m determines that message 0001 has already been sent but that message 0002 has not. In this example therefore, and as shown in FIG. 13(f), $HMD_2$ sends message 0002 at stage n to the wireless router 26, the wireless router 26 sends message 0002 to the intended recipient(s) at stage p, and the global H-msg list 86 is again updated at stage q, this time to indicate that message 0002 has also been sent. It can be seen in FIG. 13(f) that the global H-msg list 86 can include additional information such as that identifying which HMD sent the message. This information can be provided in the hosted message sent list 85 to indicate to, for example, the SMD, which host carried the hosted message 16' successfully to the coverage area 14. As noted above, this information can be used by the SMD or the wireless router 26 to reward credits to the corresponding HMD for participating, or simply used for tracking and auditing purposes.

Figure 13G:
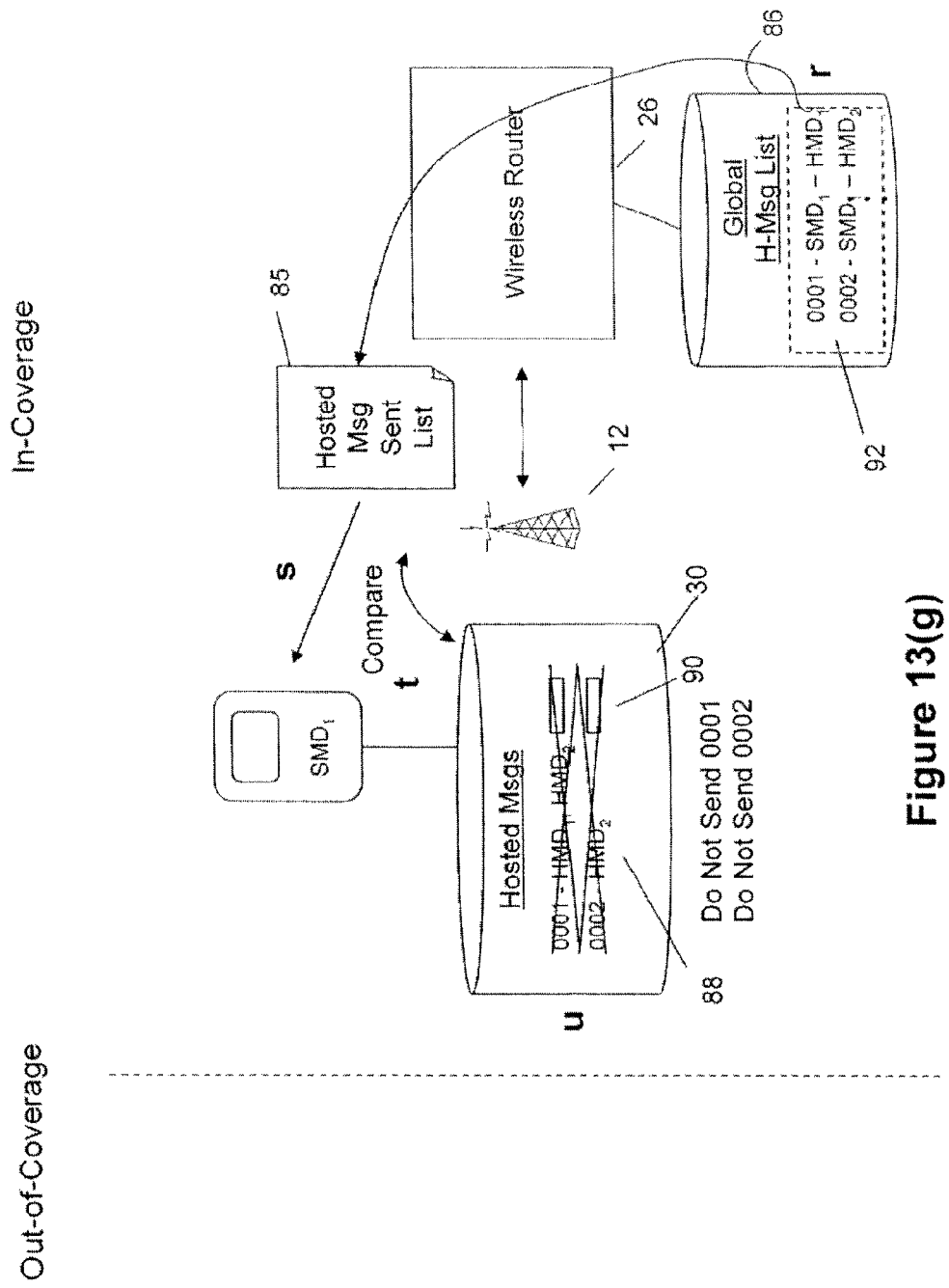

FIG. 13(g) illustrates stages r through u which are similar to the stages shown in FIG. 9(d) but includes details of both message 0001 and message 0002. Details of these stages therefore need not be reiterated. FIG. 13(g) therefore illustrates that although multiple HMDs were used and such HMDs entered coverage at different times and carried different message sets, the SMD, once entering back into coverage, is able to determine which hosted messages 16' have been sent to avoid duplicates, and to update its UI and local hosted message list 30. The series of stages shown in FIG. 13 also illustrates that by comparing local information on the mobile device 10 with information maintained and provided by (or requested from) the wireless router 26, the possibility of duplicate messages 16 being sent is avoided.

Figure 14:
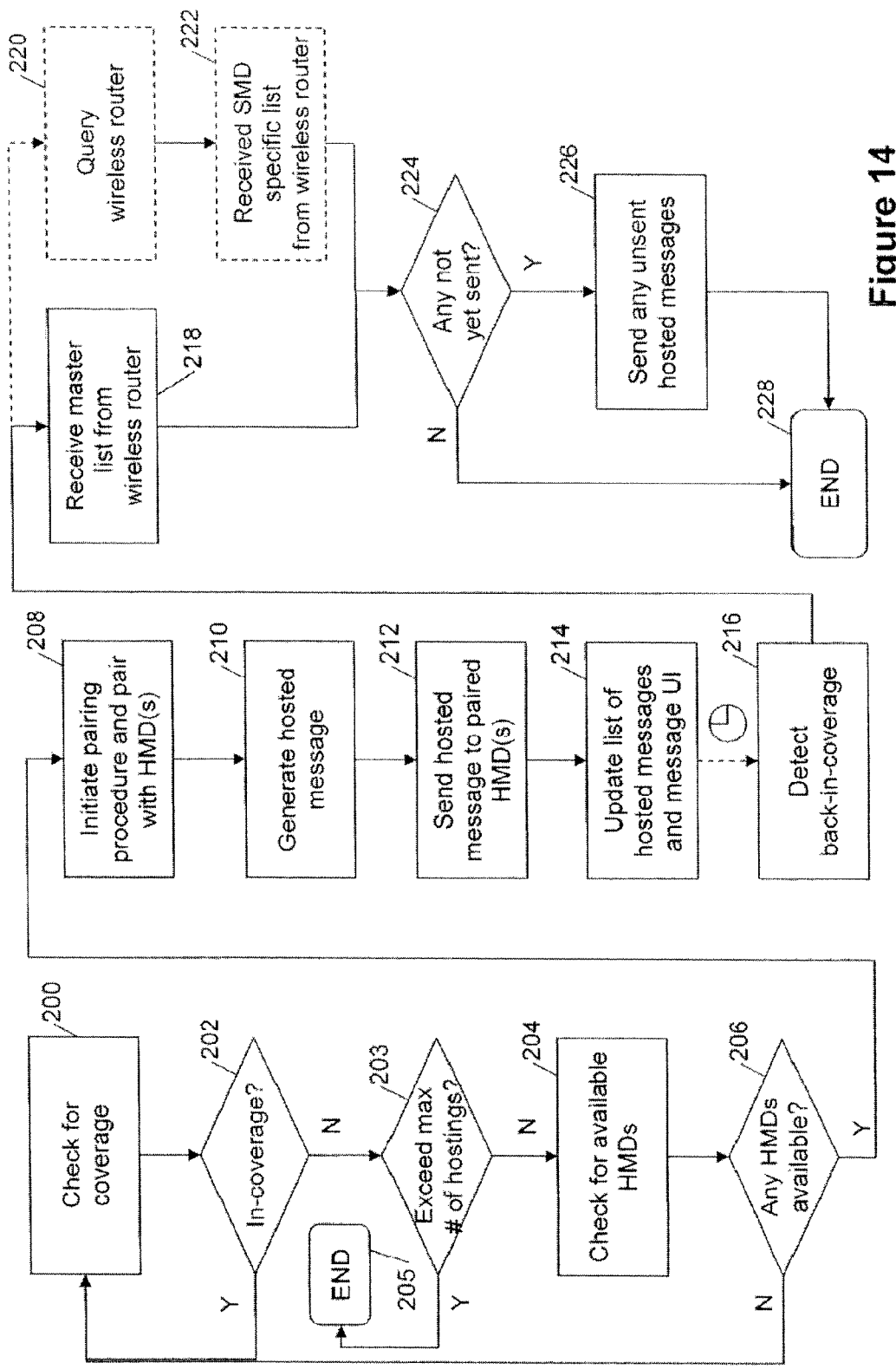
FIG. 14 is a flow diagram illustrating exemplary computer executable operations for using the source message module to send a message via an HMD.

FIG. 14 illustrates a set of computer executable instructions that when executed by a processor 102 in the mobile device 10, cause the source message module 50 to operate the mobile device 10 as an SMD. At 200, the source message module 50 uses the coverage detection module 66 to check for coverage, e.g. through the communication subsystem 104. This can be done periodically or continuously. At 202, it is determined whether or not the mobile device 10 is in coverage. If yes, then the mobile device 10 does not need to operate as an SMD and can return to checking for coverage (either periodically or continuously). If there is no coverage, the source message module 50 uses the short range communications module 122 to determine if any HMD candidates are available at 204. This can be done by referencing a list of devices within range via Bluetooth® or other suitable short range system/protocol.

To prevent sending a message 16 to an extreme number of HMDs, e.g. when passing thousands of vehicles on a highway, in a crowded public area, etc.; the mobile device 10 may also keep track of how many HMDs have received each message 16 to be hosted. In this way, the operations shown in FIG. 14 can be repeated multiple times but only up to a certain maximum threshold. At 203, the mobile device 10 references an internal counter or otherwise a stored value indicating to how many HMDs the message 16 has been provided as a hosted message 16'. If the threshold, i.e. the maximum number hostings, has not been met or exceeded, the procedure shown in FIG. 14 can continue at 204. If the threshold has already been met or exceeded at 203, the mobile device 10 can end the procedure at 205.

At 206, the source message module 50 determines if any HMD candidates are available. If not, the source message module 50 may continue checking for coverage and the presence of HMDs according to a predetermined schedule. If at least one HMD is found at 206, a pairing procedure is initiated at 208 with any HMD within range. The pairing procedure may proceed, for example, as shown in FIG. 8. Next, at 210, assuming that at least one HMD is paired with the mobile device 10, the mobile device 10 may now be considered an SMD, and a hosted message 16' is generated at 210. The hosted message 18' is then sent to any paired HMD that is still within range at 212, and the list of hosted messages, in this example the hosted messages database 30 is updated and the message application GUI 94 updated at 214. It can be appreciated that 210 to 214 can be repeated for additional messages if applicable.

After some time, the mobile device 10 may detect that it is back in coverage at 216. If the system is configured to have the wireless router 26 provide a master list 85, such a master list is received at 218. If instead the mobile device 10 is to query the wireless router 26, such a query is made at 220. Based on the query sent at 220, the mobile device 10 would then expect a reply from the wireless router 26 at 222 which includes a specific list from the global H-msg cache 86. In either case, the source message module 50 determines if any hosted messages 16' that it is carrying have not yet been sent at 224. If not, i.e. if all the hosted messages 16' it was carrying have already been sent, the procedure ends at 228. If instead there is a list of one or more hosted messages 16' that have not yet been sent, such unsent hosted messages 16' are sent at 226.

FIG. 15 illustrates a set of computer executable instructions that when executed by a processor 102 in the mobile device 10, cause the host message module 52 to operate the mobile device 10 as an HMD. As discussed above, prior to engaging an SMD to carry hosted messages 16, the HMD may wish to first determine if it is even suitable to be an HMD at that time, i.e. before determining this at the pairing stage. This can be done to conserve battery power, conserve memory, etc. At 251, the HMD may utilize the criteria shown in FIG. 8 for determining if it is suitable as an HMD and if the criteria are met at 253, it may accept pairing requests as will be discussed. For example, the potential HMD may keep their Bluetooth® radio off until they determine that they are a suitable HMD. If the criteria are met, or if the HMD does not perform 251 and 253, at 250, the host message module 52 detects a request to be paired with an SMD. This may occur by receiving a request message (not shown) via the Bluetooth® or other short range protocol via the short range communications module 122. At 252, the host message module 52 uses the host pairing module 60' and the device criteria 61 to determine if the mobile device 10 is in a suitable state for being an HMD (as described above) and, if so, to participate in the pairing procedure, e.g. as shown in FIG. 8.

Assuming that the pairing procedure is successful at 252, the mobile device 10 then receives one or more hosted messages 16' from the SMD at 254, and updates its H-msg cache 32 and, if necessary, its UI (e.g. to show the hosted messages 16' in their outbox, etc.) at 256. If further messages are to be provided to the mobile device 10 by the SMD, 254 and 256 may be repeated as necessary. Some time later at 258, the host message module 52 determines using the coverage detection module 66, that the mobile device 10 is back in coverage. Similar to when acting as an SMD, the host message module 52 would then undergo 260, 262, 264, 266, 268, and 270 shown in FIG. 15 in a manner similar to 218 to 228 shown in FIG. 14 and thus details thereof need not be reiterated. In both FIGS. 14 and 15 it may be noted that whether acting as an SMD or an HMD, the host message module 52 and source message module 50 can obtain or provide the necessary information to determine which if any of the hosted messages 16' in their cache 32 or list 30 have already been sent and thus can avoid sending a duplicate message 16.

Although the above has been described with reference to certain specific embodiments, various modifications thereof will be apparent to those skilled in the art without departing from the scope of the claims appended hereto.

The invention claimed is:

1. A method performed by a server device for enabling a first mobile device to send a message to a data communication network on behalf of a second mobile device, the method comprising:
   determining that the first mobile device is back into coverage with respect to the data communication network, the first mobile device having received a hosted message from the second mobile device while the first and second mobile devices were out of coverage with respect to the data communication network;
   providing information to the first mobile device indicative of delivery of hosted messages using the data communication network to enable the first mobile device to use the information to determine if the hosted message to be sent by the first mobile device on behalf of the second mobile device has already been sent to the second mobile device, the information comprising a unique message identifier for each hosted message;
   enabling the first mobile device to send the hosted message to the data communication network if the hosted message has not already been sent; and
   updating the information as hosted messages are sent to the data communication network by the server device.

2. The method of claim 1, further comprising receiving the hosted message from the first mobile device prior to sending the hosted message to the data communication network.

3. The method of claim 1, wherein the hosted message is provided to the first mobile device by the second mobile device while the first and second mobile devices are capable of communicating with each other via a short range communication protocol.

4. The method of claim 1, wherein the information is stored in a global cache, at least one of the first and second mobile devices comprising a local cache for storing hosted messages.

5. The method of claim 1, further comprising updating the information after sending the hosted message to the data communication network.

6. The method of claim 1, wherein the information comprises a global list of hosted messages that have been sent, the list of hosted messages is provided to the first mobile device to have the first mobile device determine whether or not to send the hosted message via the server device.

7. The method of claim 1, wherein the information comprises a list of hosted messages associated with the first mobile to enable the first mobile device to determine whether or not to send the hosted message via the server device.

8. A server device operable to enable a first mobile device to send a message to a data communication network on behalf of a second mobile device, the server device comprising:
   a processor; and
   a memory, the memory comprising computer executable instructions that, when executed by the processor, operate the server device to:
      determine that the first mobile device is back into coverage with respect to the data communication network, the first mobile device having received a hosted message from the second mobile device while the first and second mobile devices were out of coverage with respect to the data communication network;
      provide information to the first mobile device indicative of delivery of hosted messages using the data communication network to enable the first mobile device to use the information to determine if the hosted message to be sent by the first mobile device on behalf of the second mobile device has already been sent to the second mobile device, the information comprising a unique message identifier for each hosted message;
      enable the first mobile device to send the hosted message to the data communication network if the hosted message has not already been sent; and
      update the information as hosted messages are sent to the data communication network by the server device.

9. The server device of claim 8, wherein the computer executable instructions further comprise instructions to receive the hosted message from the first mobile device prior to sending the hosted message to the data communication network.

10. The server device of claim 8, wherein the hosted message is provided to the first mobile device by the second mobile device while the first and second mobile devices are capable of communicating with each other via a short range communication protocol.

11. The server device of claim 8, wherein the information is stored in a global cache, at least one of the first and second mobile devices comprising a local cache for storing hosted messages.

12. The server device of claim 8, wherein the computer executable instructions further comprise instructions to update the information after sending the hosted message to the data communication network.

13. The server device of claim 8, wherein the information comprises a global list of hosted messages that have been sent, the list of hosted messages is provided to the first mobile device to have the first mobile device determine whether or not to send the hosted message via the server device.

14. The server device of claim 8, wherein the information comprises a list of hosted messages associated with the first mobile to enable the first mobile device to determine whether or not to send the hosted message via the server device.

15. A non-transitory computer readable medium comprising computer executable instructions to be performed by a server device in enabling a first mobile device to send a message to a data communication network on behalf of a second mobile device, the computer readable medium comprising instructions for:

determining that the first mobile device is back into coverage with respect to the data communication network, the first mobile device having received a hosted message from the second mobile device while the first and second mobile devices were out of coverage with respect to the data communication network;

providing information to the first mobile device indicative of delivery of hosted messages using the data communication network to enable the first mobile device to use the information to determine if the hosted message to be sent by the first mobile device on behalf of the second mobile device has already been sent to the second mobile device, the information comprising a unique message identifier for each hosted message;

enabling the first mobile device to send the hosted message to the data communication network if the hosted message has not already been sent; and updating the information as hosted messages are sent to the data communication network by the server device.

\* \* \* \* \*